US011671596B2

(12) United States Patent
Fleureau et al.

(10) Patent No.: US 11,671,596 B2
(45) Date of Patent: Jun. 6, 2023

(54) METHODS AND APPARATUS FOR DEPTH ENCODING AND DECODING

(71) Applicant: InterDigital VC Holdings, Inc., Wilmington, DE (US)

(72) Inventors: Julien Fleureau, Cesson-Sevigne (FR); Renaud Dore, Cesson-Sevigne (FR); Franck Thudor, Cesson-Sevigne (FR); Thierry Tapie, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/047,251

(22) PCT Filed: Apr. 9, 2019

(86) PCT No.: PCT/US2019/026433

§ 371 (c)(1),
(2) Date: Oct. 13, 2020

(87) PCT Pub. No.: WO2019/199714

PCT Pub. Date: Oct. 17, 2019

(65) Prior Publication Data

US 2021/0385454 A1 Dec. 9, 2021

(30) Foreign Application Priority Data

Apr. 13, 2018 (EP) .................................... 18305462

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/179* (2014.11); *H04N 19/597* (2014.11)

(58) Field of Classification Search
CPC .. H04N 19/124; H04N 19/176; H04N 19/179; H04N 19/597
See application file for complete search history.

(56) References Cited

U.S. PATENT DOCUMENTS

2013/0022111 A1 1/2013 Chen et al.
2013/0069968 A1* 3/2013 Lee ...................... G09G 3/2077
345/596

(Continued)

FOREIGN PATENT DOCUMENTS

CN 103890830 A 6/2014
CN 105009575 A 10/2015

(Continued)

OTHER PUBLICATIONS

English Language Translation, Korean Patent Publication No. 101642965, Jul. 26, 2016.

(Continued)

*Primary Examiner* — Richard T Torrente
(74) *Attorney, Agent, or Firm* — Condo Roccia Koptiw LLP

(57) ABSTRACT

Methods and device for encoding/decoding data representative of depth of a 3D scene. The depth data are quantized in a range of quantized depth values larger than a range of encoding values allowed by a determined encoding bit depth. For blocks of pixels comprising the depth data, a first set of candidate quantization parameters is determined. A second set of quantization parameters is determined as a subset of the union of the first sets. The second set comprising candidate quantization parameters common to a plurality of blocks. One or more quantization parameters of the second set being associated with each block of pixels of the picture. The second set of quantization parameters is encoded, and the quantized depth values are encoded according to the quantization parameters.

28 Claims, 10 Drawing Sheets

10

(51) Int. Cl.
*H04N 19/179* (2014.01)
*H04N 19/597* (2014.01)

(56) References Cited

U.S. PATENT DOCUMENTS

| | | | | |
|---|---|---|---|---|
| 2015/0016542 | A1 | 1/2015 | Rosewarne et al. | |
| 2016/0007005 | A1* | 1/2016 | Konieczny | H04N 13/161 348/43 |
| 2017/0078667 | A1 | 3/2017 | Tourapis et al. | |
| 2018/0124399 | A1* | 5/2018 | Su | H04N 19/136 |
| 2019/0020875 | A1* | 1/2019 | Liu | H04N 19/192 |
| 2019/0124366 | A1* | 4/2019 | Zhao | H04N 19/124 |
| 2019/0158831 | A1* | 5/2019 | Jung | H04N 19/157 |

FOREIGN PATENT DOCUMENTS

| | | | |
|---|---|---|---|
| CN | 107439012 | A | 12/2017 |
| EP | 1591963 | A1 | 11/2005 |
| KR | 101642965 | B1 | 7/2016 |
| RU | 2571511 | C2 | 12/2015 |
| RU | 2637480 | C2 | 12/2017 |
| WO | 2014168642 | A1 | 10/2014 |
| WO | WO 2016164235 | A1 | 10/2016 |

OTHER PUBLICATIONS

Jin et al., "An Accurate and Efficient Nonlinear Depth Quantization Scheme", Advances in Multimedia Information Processing—PCM 2015. 16th Pacific-Rim Conference on Multimedia, LNCS 9315, Aug. 2015, pp. 390-399.

Feldmann et al., "Nonlinear Depth Scaling for Immersive Video Applications", Proceedings of the 4th European Workshop on Image Analysis for Multimedia Interactive Services 2003, London, England, Apr. 9, 2003, pp. 433-438.

Li, D., "A Method for Stereoscopic Images Generation in Virtual Reality Systems", 2016 International Conference on Virtual Reality and Visualization (ICVRV), Hangzhou, China, Sep. 24, 2016, pp. 385-392.

Stankiewicz et al., "Nonlinear Depth Representation for 3D Video Coding", 2013 20th IEEE International Conference on Image Processing (ICIP), Melbourne, Australia, Sep. 15, 2013, 5 pages.

ISO/IEC, "Coding of Audio-Visual Objects Part 12: ISO Base Media File Format", 14496-12, Dec. 15, 2015, 248 pages.

ITU-T, "Advanced Video Coding for Generic Audiovisual Services", Recommendation ITU-T H.264, Series H: Audiovisual and Multimedia Systems, Infrastructure of Audiovisual Services—Coding of Moving Video, Oct. 2016, 804 pages.

ITU-T, "High Efficiency Video Coding", Series H: Audiovisual and Multimedia Systems, 3D-HEVC, Recommendation ITU-T H.265 Annex G (pp. 507-525) and I (pp. 549-641), Dec. 2016, 135 pages.

ITU-T, "High Efficiency Video Coding", H.265-v2, Series H: Audiovisual and Multimedia Systems, Infrastructure of Audiovisual Services—Coding of Moving Video, Oct. 2014, 540 pages.

ITU-T, "Information Technology—Digital Compression and Coding of Continuous-Tone Still Images—Requirements and Guidelines", International Standard ISO/IEC 10918-1, ITU-T Recommendation T.81 (1992)—Corrigendum 1, Series T: Terminals for Telematic Services, Technical Corrigendum 1: Patent Information Update, Jan. 2004, 12 pages.

* cited by examiner

50

110

| Id | Value (32 bits) |
|---|---|
| 0 | RESERVED |
| 1 | 1200 |
| 2 | 1421 |
| 3 | 1689 |
| 4 | 2500 |
| 5 | 3951 |
| 6 | 4500 |
| 7 | 5010 |
| | |
| 127 | 0 |
| 128 | 1\|7\|0\|0 |
| 129 | 4\|21\|0\|0 |
| 130 | 12\|22\|0\|0 |
| 131 | 31\|39\|0\|0 |
| 132 | 2\|24\|0\|0 |
| 133 | 17\|28\|30\|0 |
| | |
| 255 | 0\|0\|0\|0 |

REFERENCE

111

112

METHODS AND APPARATUS FOR DEPTH ENCODING AND DECODING

CROSS REFERENCE TO RELATED APPLICATIONS

This application is the national stage entry under 35 U.S.C. § 371 of International Application PCT/US2019/026433, filed Apr. 9, 2019 which was published in accordance with PCT Article 21(2) on Oct. 17, 2019, in English, and which claims the benefit of European Patent Application No. 18305462.6, filed Apr. 13, 2018.

TECHNICAL FIELD

The present disclosure relates to the domain of tree-dimensional (3D) scene and volumetric video content. The present disclosure is also understood in the context of the encoding and/or the formatting of the data representative of the depth of a 3D scene, for example for the rendering of volumetric content on end-user devices such as mobile devices or Head-Mounted Displays.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume, allowing limited translation of the head and parallax experience. This second context is a valuable trade-off between free navigation and passive viewing conditions of a seated audience member.

3DoF videos may be encoded in a stream as a sequence of rectangular color images generated according to a chosen projection mapping (e.g. cubical projection mapping, pyramidal projection mapping or equirectangular projection mapping). This encoding has the advantage to make use of standard image and video processing standards. 3Dof+ and 6DoF videos require additional data to encode the depth of colored points of point clouds. The kind of rendering (i.e. 3DoF or volumetric rendering) for a volumetric scene is not known a priori when encoding the scene in a stream. Up to date, streams are encoded for one kind of rendering or the other. There is a lack of a stream, and associated methods and devices, that can carry data representative of a volumetric scene that can be encoded at once and decoded either as a 3DoF video or as a volumetric video (3Dof+ or 6DoF).

Beyond the specific case of volumetric video, the encoding and decoding of depth information of a 3D scene or a volumetric content may be an issue, especially when the range of depth values to be encoded is large and the bit depth available for the encoding does not provide with a sufficient amount of encoding values.

SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding data representative of depth of a 3D scene, the method comprising:

- quantizing the data to obtain a number of quantized depth values greater than a number of encoding values allowed by a determined encoding bit depth;

for each block of first pixels of a picture comprising the data, determining a first set of candidate quantization parameters representative of each range of quantized depth values comprised in each block of first pixels, the first set being determined according to the number of encoding values;

determining a second set of quantization parameters as a subset of a union of the first sets, the second set comprising candidate quantization parameters common to a plurality of blocks of first pixels of the picture, one or more quantization parameters of the second set being associated with each block of first pixels of the picture;

encoding the second set of quantization parameters; and encoding the quantized depth values according to the second set of quantization parameters.

The present disclosure relates to a device configured to encode data representative of depth of a 3D scene, the device comprising a memory associated with at least one processor configured to:

quantize the data to obtain a number of quantized depth values greater than a number of encoding values allowed by a determined encoding bit depth;

for each block of first pixels of a picture comprising the data, determine a first set of candidate quantization parameters representative of each range of quantized depth values comprised in each block of first pixels, the first set being determined according to the number of encoding values;

determine a second set of quantization parameters as a subset of a union of the first sets, the second set comprising candidate quantization parameters common to a plurality of blocks of first pixels of the picture, one or more quantization parameters of the second set being associated with each block of first pixels of the picture;

encode the second set of quantization parameters; and encode the quantized depth values according to the second set of quantization parameters.

The present disclosure relates to a device configured to encode data representative of a 3D scene, the device comprising:

a quantizer configured to quantize the data to obtain a number of quantized depth values greater than a number of encoding values allowed by a determined encoding bit depth;

a determiner configured to determine, for each block of first pixels of a picture comprising the data, a first set of candidate quantization parameters representative of each range of quantized depth values comprised in each block of first pixels, the first set being determined according to the number of encoding values;

a determiner configured to determine a second set of quantization parameters as a subset of a union of the first sets, the second set comprising candidate quantization parameters common to a plurality of blocks of first pixels of the picture, one or more quantization parameters of the second set being associated with each block of first pixels of the picture;

an encoder configured to encode the second set of quantization parameters; and an encoder configured to encode the quantized depth values according to the second set of quantization parameters.

The present disclosure relates to a device configured to encode data representative of a 3D scene, the device comprising:

means for quantizing the data to obtain a number of quantized depth values greater than a number of encoding values allowed by a determined encoding bit depth;

means for determining, for each block of first pixels of a picture comprising the data, a first set of candidate quantization parameters representative of each range of quantized depth values comprised in each block of first pixels, the first set being determined according to the number of encoding values;

means for determining a second set of quantization parameters as a subset of a union of the first sets, the second set comprising candidate quantization parameters common to a plurality of blocks of first pixels of the picture, one or more quantization parameters of the second set being associated with each block of first pixels of the picture;

means for encoding the second set of quantization parameters; and means for encoding the quantized depth values according to the second set of quantization parameters.

According to a particular characteristic, a list of identifiers mapping to the second set of quantization parameters is further encoded, the second set of quantization parameters being encoded according to the list of identifiers.

According to a specific characteristic, the list of identifiers comprises first identifiers each mapped to one quantization parameter of the second set and second identifiers each mapped to a plurality of the first identifiers, the second set of quantization parameters being encoded by encoding an image comprising a number of second pixels corresponding to the number of blocks of first pixels of the picture, each second pixel comprising:

a first identifier of the list identifying the quantization parameter associated with the block of first pixels corresponding to each second pixel, when a single quantization parameter is associated with the block of first pixels; or a second identifier of the list identifying the quantization parameters associated with the block of first pixels corresponding to each second pixel, when a plurality of quantization parameters is associated with the block of first pixels.

According to another specific characteristic, when the data is quantized according to a quantization function having a quantization error accounting for depth and human visual perception, the greater the depth, the greater the quantization error.

According to a further specific characteristic, the number of encoding values is allocated to each block of first pixels to encode the quantized depth values comprised in each block of first pixels, a first part of the number of encoding values being allocated to the encoding of each range of quantized depth values comprised in each block of first pixels, two ranges of encoded quantized depth values being separated by a second part of the number of encoding values, the second part being not used for the encoding of quantized depth values.

According to a further specific characteristic, the picture is part of a group of temporally successive pictures, the second set of quantization parameters being common to each picture of the group of temporally successive pictures.

The present disclosure relates to a method of decoding data representative of depth of a 3D scene, the method comprising:

decoding a set of quantization parameters, one or more quantization parameters of the set being associated with each block of first pixels of a picture, at least a part of the quantization parameters of the set being common to a plurality of blocks of first pixels of the picture;

decoding quantized depth values comprised in the first pixels of the picture according to the one or more quantization parameters associated with each block of first pixels, the number of decoded quantized depth values being greater than a number of encoding values allowed by a determined encoding bit depth.

The present disclosure relates to a device configured to decode data representative of depth of a 3D scene, the device comprising a memory associated with at least one processor configured to:

decode a set of quantization parameters, one or more quantization parameters of the set being associated with each block of first pixels of a picture, at least a part of the quantization parameters of the set being common to a plurality of blocks of first pixels of the picture;

decode quantized depth values comprised in the first pixels of the picture according to the one or more quantization parameters associated with each block of first pixels, the number of decoded quantized depth values being greater than a number of encoding values allowed by a determined encoding bit depth.

The present disclosure relates to a device configured to decode data representative of depth of a 3D scene, the device comprising:

a decoder configured to decode a set of quantization parameters, one or more quantization parameters of the set being associated with each block of first pixels of a picture, at least a part of the quantization parameters of the set being common to a plurality of blocks of first pixels of the picture;

a decoder configured to decode quantized depth values comprised in the first pixels of the picture according to the one or more quantization parameters associated with each block of first pixels, the number of decoded quantized depth values being greater than a number of encoding values allowed by a determined encoding bit depth.

The present disclosure relates to a device configured to decode data representative of depth of a 3D scene, the device comprising:

means for decoding a set of quantization parameters, one or more quantization parameters of the set being associated with each block of first pixels of a picture, at least a part of the quantization parameters of the set being common to a plurality of blocks of first pixels of the picture;

means for decoding quantized depth values comprised in the first pixels of the picture according to the one or more quantization parameters associated with each block of first pixels, the number of decoded quantized depth values being greater than a number of encoding values allowed by a determined encoding bit depth.

According to a particular characteristic, a list of identifiers mapping to the set of quantization parameters is further decoded, the set of quantization parameters being decoded according to the list of identifiers.

According to a specific characteristic, the list of identifiers comprises first identifiers each mapped to one quantization parameter of the set and second identifiers each mapped to a plurality of the first identifiers, the set of quantization parameters being decoded from an image comprising a number of second pixels corresponding to the number of blocks of first pixels of the picture, each second pixel comprising:

a first identifier of the list identifying the quantization parameter associated with the block of first pixels corresponding to each second pixel, when a single quantization parameter is associated with the block of first pixels; or a second identifier of the list identifying the quantization parameters associated with the block of first pixels corresponding to each second pixel, when a plurality of quantization parameters is associated with the block of first pixels.

According to another characteristic, the data is obtained from the decoded quantized depth values according to a quantization function having a quantization error accounting for depth and human visual perception, the greater the depth, the greater the quantization error.

According to a further characteristic, the picture is part of a group of temporally successive pictures, the set of quantization parameters being common to each picture of the group of temporally successive pictures The present disclosure also relates to a bitstream carrying data representative of the depth of a 3D scene, the data comprising, in a first syntax element, data representative of quantization parameters associated with blocks of pixels of a picture; in a second syntax element, data representative of quantized depth values encoded according to the quantization parameters.

The present disclosure also relates to a computer program product comprising program code instructions to execute the steps of the method of encoding or decoding data representative of depth of a 3D scene, when this program is executed on a computer.

The present disclosure also relates to a (non-transitory) processor readable medium having stored therein instructions for causing a processor to perform at least the above-mentioned method of encoding or decoding data representative of depth of a 3D scene.

LIST OF FIGURES

The present disclosure will be better understood, and other specific features and advantages will emerge upon reading the following description, the description making reference to the annexed drawings wherein.

DETAILED DESCRIPTION OF EMBODIMENTS

Figure 1:
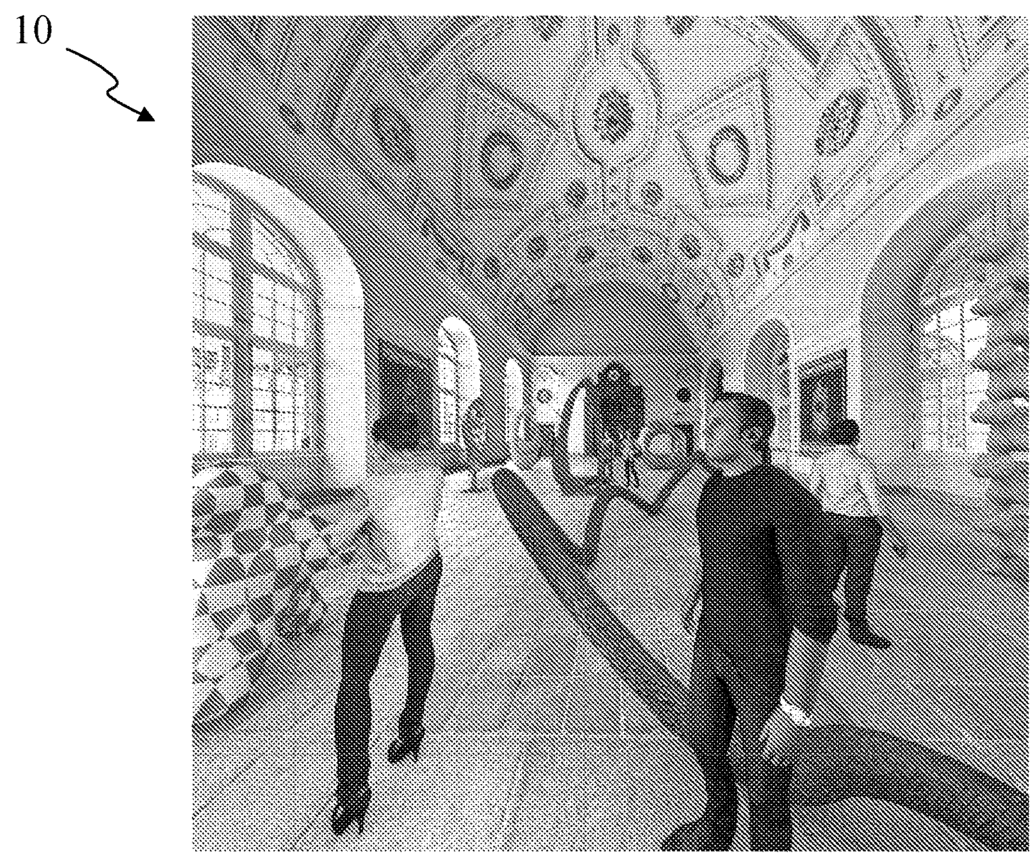
FIG. 1 shows an image representing a three-dimension (3D) scene, according to a non-restrictive embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

According to non-limitative embodiments of the present disclosure, methods and devices to encode one or more pictures comprising depth information (also called depth map(s)) of a 3D scene in a container and/or in a bitstream are disclosed. Methods and devices to decode pictures of depth (or depth maps) of a 3D scene from a stream are also disclosed. Examples of the syntax of a bitstream for the encoding of one or more pictures of depth information/depth maps are also disclosed.

According to a non-limitative aspect, the present principles will be described in reference to a first particular embodiment of a method of (and a device configured for) encoding data representative of depth of a 3D scene (which may be represented with a volumetric content, also called immersive video, or with standard 3D content) into a container and/or a bitstream.

To reach that aim, data representative of the depth (e.g. distance or depth values expressed as floating-point values associated with the elements, e.g. points, of the 3D scene) of the 3D scene is quantized in a number of quantized depth values that is greater than the number of encoding values allowed by a determined encoding bit depth. For example, 8 bits encoding bit depth allows an encoding with 256 ($2^8$) values and 10 bits encoding bit depth allows an encoding with 1024 ($2^{10}$) values while the number of quantized depth values may for example be equal to 16384 ($2^{14}$) or to 65536 ($2^{16}$). Quantizing depth data with a great number of values enable the quantizing of big range of depth data (for example depth or distances comprised between 0 and 50 meters or between 0 and 100 meters or even bigger ranges) with a quantization step that remains small over the whole range, minimizing the quantization error, especially for objects close to the point(s) of view of the scene (e.g. foregrounds objects).

The picture comprising the data representative of depth is divided into blocks of pixels (e.g. blocks of 8×8 or 16×16 pixels) and a first set of candidate quantization parameters is determined for each block of pixels. A candidate quantization parameter corresponds to a quantization value that is representative of a range of quantization values associated with the pixels of the block (the quantization values being obtained by quantizing the depth data stored in the pixels of the picture). A first set of candidate quantization parameters is determined considering the number of encoding values for the considered block (e.g. 1024 values for the block), a candidate quantization parameter corresponding for example to a reference quantization value that may be used as a starting value for representing a range of quantized depth value in the limit of the number of encoding values.

A second set of quantization parameters is determined as a subset of the union of the first sets, i.e. the second set comprises a part of the candidate quantization parameters determined for all blocks of pixels of the picture. The second set being determined by retrieving the minimal number of candidate quantization parameters that enables to represent all ranges of quantized depth values of all blocks of pixels of the whole picture, i.e. by retrieving the candidate quantization parameters that are common for several blocks of pixels, when they exist.

The second set of quantization parameters is encoded, for example into a file.

The quantized depth values are then encoded according to the quantization parameters of the second set.

Encoding the quantized depth values according to the quantization parameters that are associated with the blocks of first pixels enables to have more encoding values available for the encoding of the quantized depth values, the set of encoding values allowed by a determined encoding bit depth being available for the encoding of the quantized depth values of each block (e.g. 1024 encoding values available for each block of the picture instead of 1024 encoding values available for the encoding of the whole picture).

A picture corresponds to an array of pixels, attributes (e.g. depth information and/or texture information) being associated with the pixels of the picture.

A corresponding method of (and a device configured for) decoding data representative of the depth of the 3D scene is also described with regard to the non-limitative aspect of the present principles.

FIG. 1 shows an image representing a three-dimensional (3D) scene 10 comprising a surface representation of several. The scene may have been acquired using any suitable technology. For example, it may have been created using computer graphics interface (CGI) tools. It may have been acquired with color and depth image acquisition devices. In such a case, it is possible that one or more parts of the objects that are not visible from the acquisition devices (e.g. cameras) may not be represented in the scene as described in relation to FIG. 1. The example scene illustrated in FIG. 1 comprises characters and objects in a room. The 3D scene 10 is represented according to a determined point of view in FIG. 1. This point of view may for example be part of a space of view from which a user may observe the 3D scene. According to a variant, the content of the 3D scene (depth and/or texture information) that is available corresponds only to the elements of the scene (e.g. points) that are visible from the determined point of view of FIG. 1.

Figure 2:
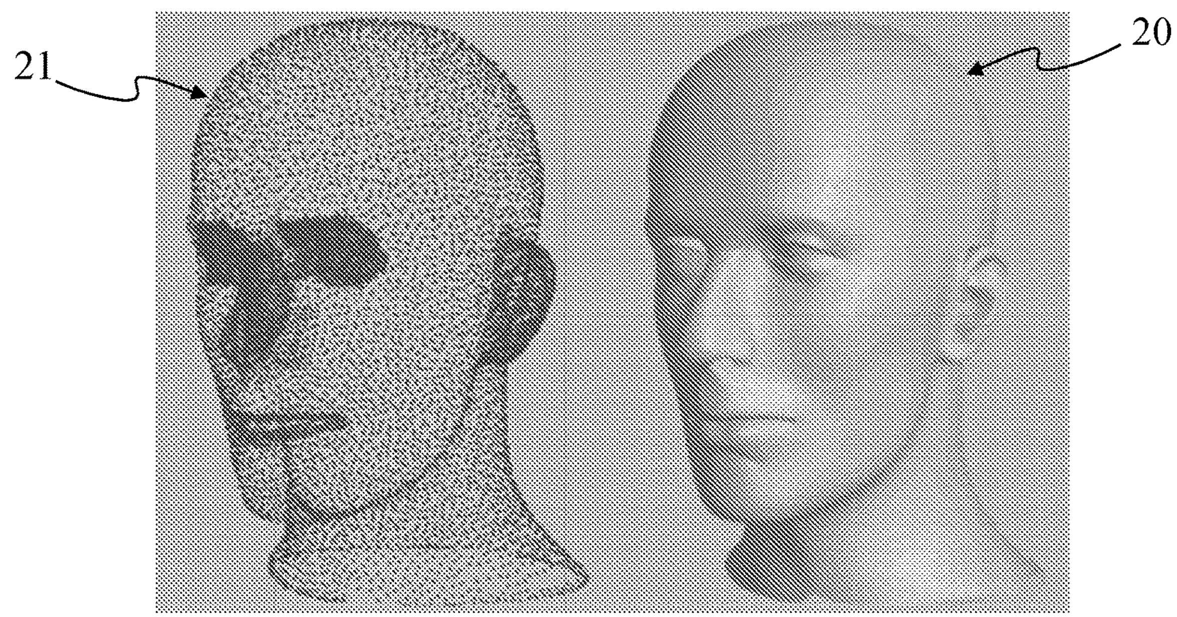
FIG. 2 shows a three-dimension (3D) model of an object of the 3D scene of FIG. 1 and points of a point cloud corresponding to the 3D model, according to a non-restrictive embodiment of the present principles.

FIG. 2 shows a three-dimension (3D) model of an object 20 and points of a point cloud 21 corresponding to the 3D model 20. The 3D model 20 and the point cloud 21 may for example correspond to a possible 3D representation of an object of the 3D scene 10, for example the head of a character. The model 20 may be a 3D mesh representation and points of point cloud 21 may be the vertices of the mesh. Points of the point cloud 21 may also be points spread on the surface of faces of the mesh. The model 20 may also be represented as a splatted version of the point cloud 21, the surface of the model 20 being created by splatting the points of the point cloud 21. The model 20 may be represented by a lot of different representations such as voxels or splines. FIG. 2 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any image representation of this 3D object to create an object.

A point cloud may be seen as a vector-based structure, wherein each point has its coordinates (e.g. three-dimensional coordinates XYZ, or a depth/distance from a given viewpoint) and one or more attributes, also called component. An example of component is the color component that may be expressed in various color spaces, for example RGB (Red, Green and Blue) or YUV (Y being the luma component and UV two chrominance components). The point cloud is a representation of the object as seen from a given viewpoint, or a range of viewpoints. The point cloud may be obtained by many ways, e.g.:

- from a capture of a real object shot by a rig of cameras, optionally complemented by depth active sensing device;
- from a capture of a virtual/synthetic object shot by a rig of virtual cameras in a modeling tool;
- from a mix of both real and virtual objects.

The volumetric parts of the 3D scene may for example be represented with one or several point clouds such as the point cloud 21.

Figure 3:
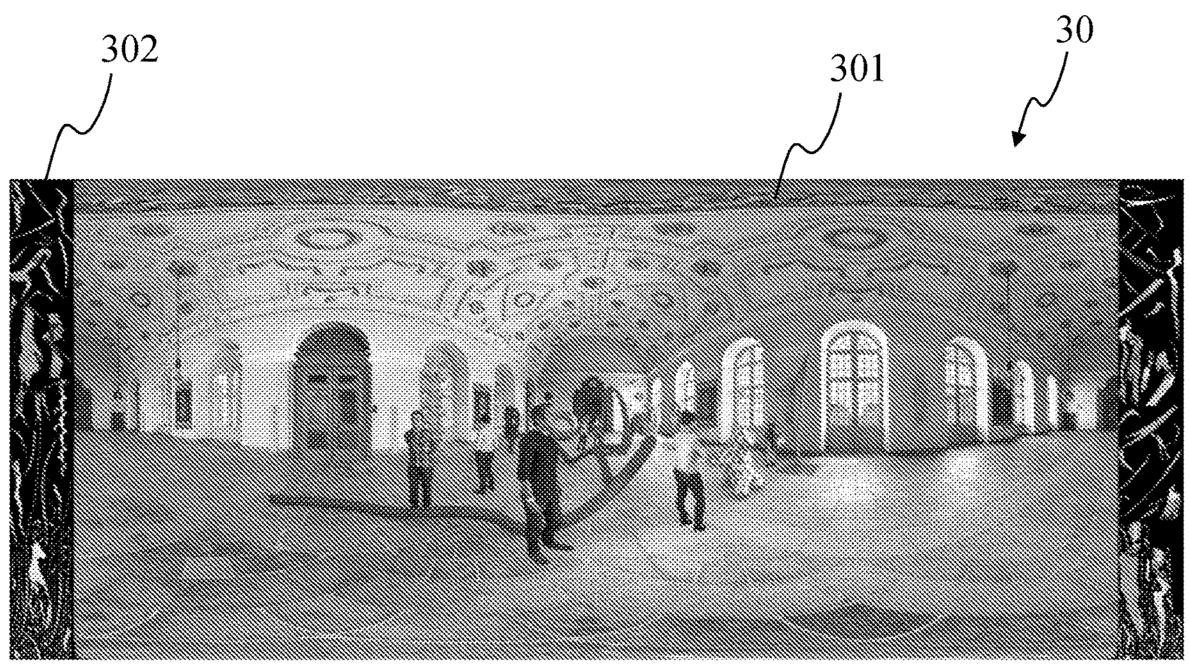
FIG. 3 shows a picture comprising texture information of the points of the 3D scene of FIG. 1, according to a non-restrictive embodiment of the present principles.

FIG. 3 shows an example of a picture 30 comprising the texture information (e.g. RGB data or YUV data) of the points of the 3D scene 10, according to a non-limiting embodiment of the present principles.

The picture 30 comprises a first part 301 comprising the texture information of the elements (points) of the 3D scene that are visible from a first viewpoint and one or more second parts 302. The texture information of the first part 301 may for example be obtained according to an equirectangular projection mapping, an equirectangular projection mapping being an example of spherical projection mapping. In the example of FIG. 3, the second parts are arranged at the left and right borders of the first part 301 but the second parts may be arranged differently. The second parts 302 comprise texture information of parts of the 3D scene that are complementary to the part visible from the first viewpoint. The second parts may be obtained by removing from the 3D scene the points that are visible from the first viewpoint (the texture of which being stored in the first part) and by projecting the remaining points according to the same first viewpoint. The latter process may be reiterated iteratively to obtain at each time the hidden parts of the 3D scene. According to a variant, the second parts may be obtained by removing from the 3D scene the points that are visible from the first viewpoint (the texture of which being stored in the first part) and by projecting the remaining points according to a viewpoint different from the first viewpoint, for example from one or more second viewpoints of a space of view centered onto the first viewpoint.

The first part 301 may be seen as a first large texture patch (corresponding to a first part of the 3D scene) and the second parts 302 comprises smaller textures patches (corresponding to second parts of the 3D scene that are complementary to the first part).

Figure 4:
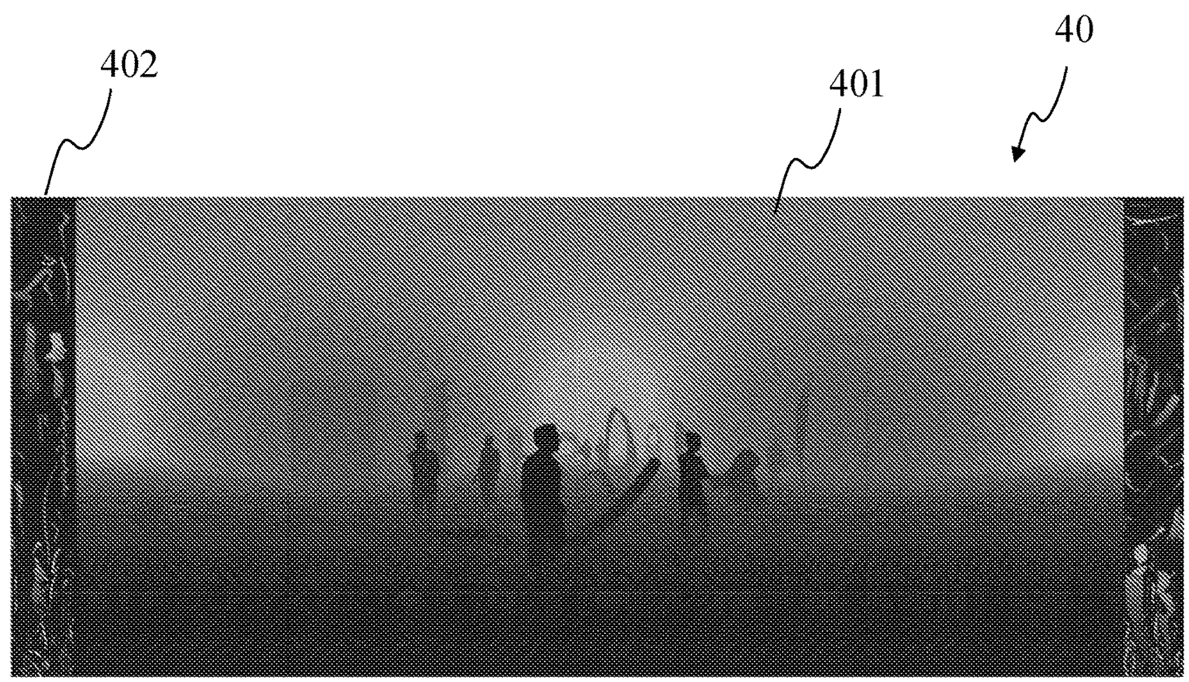
FIG. 4 shows a picture comprising depth information of the points of the 3D scene of FIG. 1, according to a non-restrictive embodiment of the present principles.

FIG. 4 shows an example of a picture 40 comprising the depth information of the points of the 3D scene 10, according to a non-limiting embodiment of the present principles. The picture 40 may be seen as the depth picture corresponding to the texture picture 30.

The picture 40 comprises a first part 401 comprising the depth information of the elements (points) of the 3D scene that are visible from the first viewpoint and one or more second parts 402. The picture 40 may be obtained in a same way as the picture 30 but contains the depth information associated with the points of the 3D scene instead of the texture information as in the picture 30.

The first part 401 may be seen as a first large depth patch (corresponding to a first part of the 3D scene) and the second parts 402 comprises smaller textures patches (corresponding to second parts of the 3D scene that are complementary to the first part).

For 3DoF rendering of the 3D scene, only one point of view, for example the first viewpoint, is considered. The user may rotate his head in three degrees of freedom around the first point of view to watch various parts of the 3D scene, but the user cannot move the first viewpoint. Points of the scene to be encoded are points which are visible from this first viewpoint, and only the texture information is needed to be encoded/decoded for the 3DoF rendering. There is no need to encode points of the scene that are not visible from this first viewpoint as the user cannot access to them by moving the first viewpoint.

With regard to 6DoF rendering, the user may move the viewpoint everywhere in the scene. In this case, it is valuable to encode every point (depth and texture) of the scene in the bitstream as every point is potentially accessible by a user who can move his/her point of view. At the encoding stage, there is no means to know, a priori, from which point of view the user will observe the 3D scene 10.

With regard to 3Dof+ rendering, the user may move the point of view within a limited space around a point of view, for example around the first viewpoint. For example, the user may move his point of view within a determined space of view centered on the first viewpoint. This enables to experience parallax. Data representative of the part of the scene visible from any point of the space of view is to be encoded into the stream, including the data representative of the 3D scene visible according to the first viewpoint (i.e. the first parts 301 and 401). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

Figures 5, 6:
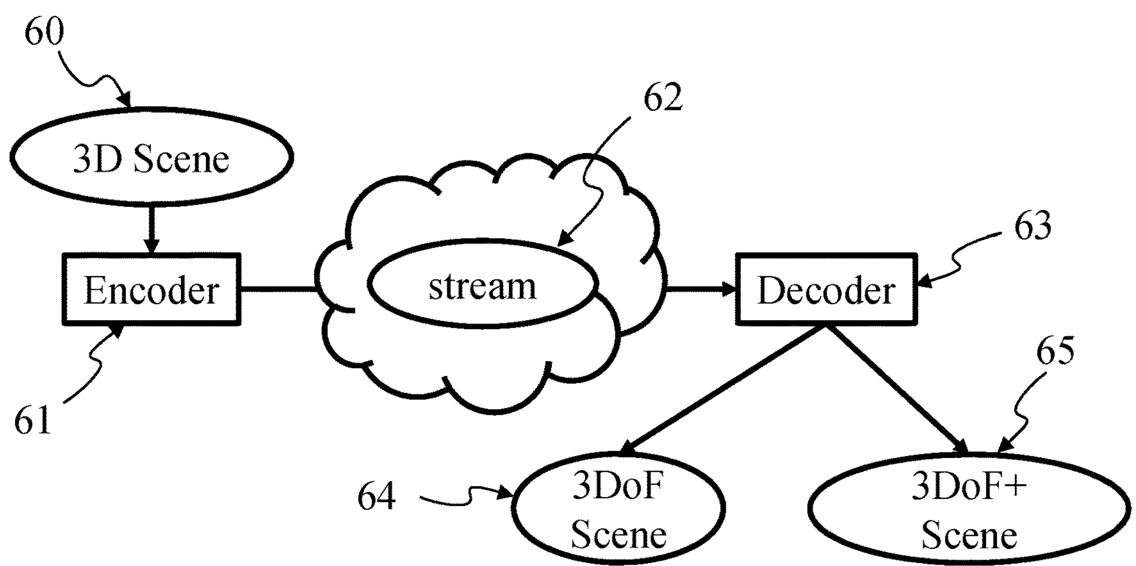
FIG. 5 shows a a picture comprising depth information of the points of the 3D scene of FIG. 1, according to a further non-restrictive embodiment of the present principles.
FIG. 6 shows an example of the encoding, transmission and decoding of data representative of the 3D scene in a format that is, at the same time, 3DoF rendering compatible and 3Dof+ rendering compatible, according to a non-restrictive embodiment of the present principles.

FIG. 5 shows an example of a picture 50 comprising the depth information of the points of the 3D scene 10, for example in the case wherein the 3D scene is acquired from a single point of view, according to a non-limiting embodiment of the present principles. The picture 50 corresponds to an array of first pixels, each first pixel comprising data representative of depth. The picture 50 may also be called a depth map. The data corresponds for example to a floating-point value indicating, for each first pixel, the radial distance to z to the viewpoint of the picture 50 (or of the center of projection when the picture 50 is obtained by projection). The depth data may be obtained with one or more depth sensors or may be known a priori, for example for CGI parts of the scene. The depth range $[z_{min}, z_{max}]$ contained in picture 50, i.e. the range of depth values comprised between the minimal depth value $z_{min}$ and the maximal depth value $z_{max}$ of the scene, may be large, for example from 0 to 100 meters. The depth data is represented with a shade of grey in FIG. 5, the darker the pixel (or point), the closer to the viewpoint.

The picture 50 may be part of a group of temporally successive pictures of the scene, called GOP (Group of Pictures). A GOP may for example comprise pictures of different types, for example a I picture (i.e. intra coded picture), a P picture (i.e. predictive coded picture) and 'B' pictures to 708 (i.e. bipredictive code picture). There is a coding relationship between pictures. For example, a P picture may be coded by referring to a I picture, a B picture may be coded by using reference to I and P pictures. The GOP may be part of an intra period, i.e. a sequence of pictures comprised between two I pictures, the first I picture belonging to said intra period and indicating the beginning of the intra period while the second (temporally speaking) I picture not belonging to said intra period but to the following intra period.

A I picture is a picture that is coded independently of all other pictures. Each intra period begins (in decoding order) with this type of picture.

A P picture comprises motion-compensated difference information relative to previously decoded pictures. In compression standards such as MPEG-1, H.262/MPEG-2, each P picture can only reference one picture, and that picture must precede the P picture in display order as well as in decoding order and must be an I or P picture. These constraints do not apply in more recent standards such as H.264/MPEG-4 AVC and HEVC.

A B picture comprises motion-compensated difference information relative to previously decoded pictures. In standards such as MPEG-1 and H.262/MPEG-2, each B picture can only reference two pictures, the one which precedes the B picture in display order and the one which follows, and all referenced pictures must be I or P pictures. These constraints do not apply in more recent standards such as H.264/MPEG-4 AVC and HEVC.

Pictures 30 and 40 may also be each part of a GOP, like picture 50.

FIG. 6 shows a non-limitative example of the encoding, transmission and decoding of data representative of the depth of a 3D scene in a format that may be, at the same time, compatible for 3DoF and 3DoF+ rendering.

A picture of a 3D scene 60 (or a sequence of pictures of the 3D scene) is encoded in a stream 62 by an encoder 61. The stream 62 comprises a first element of syntax carrying data representative of a 3D scene for a 3DoF rendering (data of the first part of the picture 30 for example) and at least a second element of syntax carrying data representative of the 3D scene for 3Dof+ rendering (e.g. data of the second parts of the picture 30 and picture 40).

The encoder 61 is for example compliant with an encoder such as:

- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en,HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

A decoder 63 obtains the stream 62 from a source. For example, the source belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

The decoder 63 decodes the first element of syntax of the stream 62 for 3DoF rendering 64. For 3Dof+ rendering 65, the decoder decodes both the first element of syntax and the second element of syntax of the stream 62.

The decoder 63 is compliant with the encoder 61, for example compliant with a decoder such as:

- JPEG;
- AVC;

HEVC;

3D-HEVC (an extension of HEVC);

VP9; or

AV1.

Figure 7A:
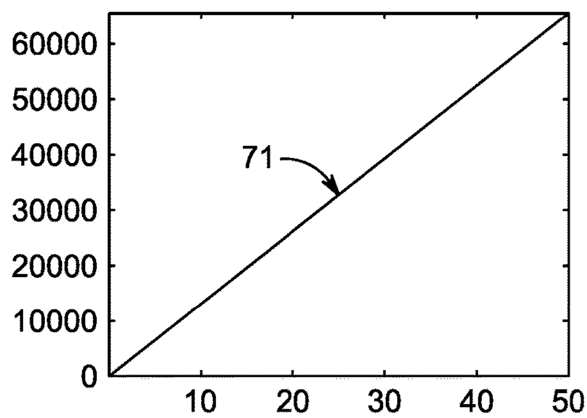
FIGS. 7A, 7B and 7C show examples of quantization functions used to quantize the depth information of the picture of FIG. 4 or 5, according to non-restrictive embodiments of the present principles.
Figure 7B:
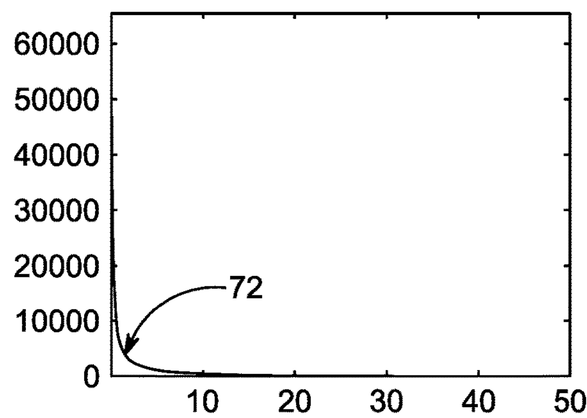
Figure 7C:
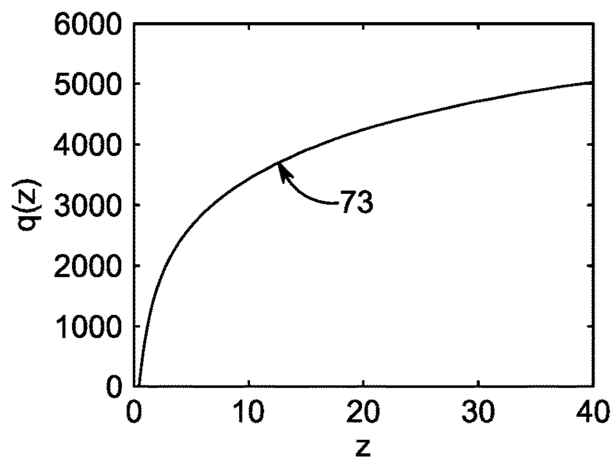

FIGS. 7A, 7B and 7C show examples of quantization functions that may be used for quantizing the depth data of pictures 40 and/or 50, according to a non-limiting embodiment of the present principle.

FIG. 7A shows a first example of a quantization function 71 used for quantizing the data representative of depth stored in the first pixels of pictures 40 and/or 50. The abscissa axis represents the depth (expressed with floating-point values, between $z_{min}$=0 and $z_{max}$=50 meters) and the ordinate axis represents the quantized depth values (between 0 and 65536). The quantization function 71 $q^l(z)$ is an affine transform of the depth z, for example:

$$q^l(z) = 2^D \frac{z - z_{min}}{z_{max} - z_{min}}$$

wherein D represents the encoding bit depth, D being for example equal to 16 in the example of FIG. 7A to obtain enough quantized depth values enabling a small quantization step, which is needed to represent the depth with a good quality, especially for objects close to the viewpoint. According to another example, D may be set to 32.

With such a quantization function 71, the quantization error is the same whatever the depth z. For example, for a 10-bits encoding (1024 values available for coding the quantized depth over the whole range of depth of the 3D scene, for example 50 meters), the error is 5 cm which may generate visible artefacts, especially for foreground objects. For a 12-bits encoding, the error is 0.8 mm. The quantization error may be: $e_q=(z_{max}-z_{min})/2^D$.

FIG. 7B shows a second example of a quantization function 72 used for quantizing the data representative of depth stored in the first pixels of pictures 40 and/or 50. The abscissa axis represents the depth (expressed with floating-point values, between $z_{min}$=0.1 and $z_{max}$=50 meters) and the ordinate axis represents the quantized depth values (between 0 and 65536). The quantization function 72 $q^i(z)$ is an affine transform of the inverse of the depth 1/z, for example:

$$q^i(z) = 2^D \frac{\frac{1}{z} - \frac{1}{z_{max}}}{\frac{1}{z_{min}} - \frac{1}{z_{max}}}$$

wherein D represents the encoding bit depth, D being for example equal to 16 in the example of FIG. 7B to obtain enough quantized depth values enabling a small quantization step, which is needed to represent the quantized depth with a good quality, especially for objects far away from the viewpoint. According to another example, D may be set to 32.

With such a quantization function 72, the quantization error is minimal for low values of depth but very high for higher values of depth. For example, for a 10-bits encoding (1024 values available for coding the quantized depth over the whole range of depth of the 3D scene, for example 50 meters), the error is 24 meters at $z_{max}$, which may generate visible artefacts for background objects. For a 12-bits encoding, the error is 38 cm. The quantization error may be: $e_q=z^2\cdot(z_{max}-z_{min})/(2^D\cdot z_{min}\cdot z_{max})$.

The quantization functions 71 and 72 are not perceptually consistent, i.e. they do not account for the visual acuity of human vision. FIG. 7C shows a third example of a quantization function 73 used for quantizing the data representative of depth stored in the first pixels of pictures 40 and/or 50, the quantization function 73 being perceptually consistent.

To explain the perceptual consistence of a quantization function, let's introduce the quantization error function:

$$e_{q^x}(z) = \frac{dz}{dq^x}(z)$$

This latter quantity represents the amount of depth variation that occurs when a quantification delta equal to 1 happens, at a given depth z, and for a given quantization function $q^x$. The error function basically helps understanding how a depth value could vary when it is obtained from an erroneous quantized input depth (typically due to compression artifacts).

Figure 8:
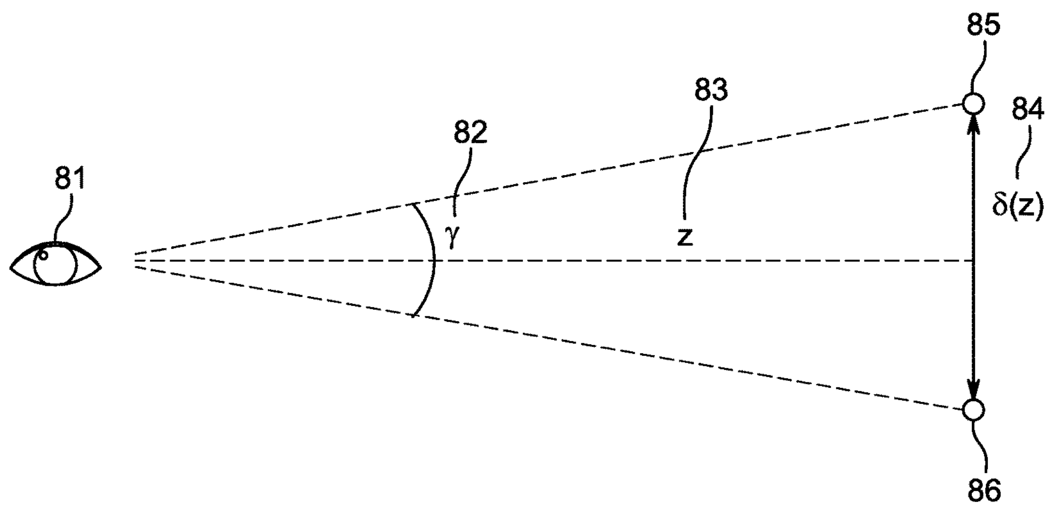
FIG. 8 shows the concept of visual acuity of human vision, according to a non-restrictive embodiment of the present principles.

Let's also introduce the concept of visual acuity of human vision, illustrated in FIG. 8. This latter represents the minimal angle $$82\gamma \sim \frac{3^\circ}{60}$$

from which a human eye 81 can distinguish 2 distinct points 85, 86 in the 3D space. From this angle 82, one can compute the minimal perceptible distance δ(z) 84 between 2 points 85, 86 that can be distinguished by a human eye at a certain distance z 83:

$$\delta(z) = 2\tan\left(\frac{\gamma}{2}\right)z = \alpha z$$

A parameter α representative of the perceptual consistence may be defined with:

$$\alpha = 2\tan\left(\frac{\gamma}{2}\right)$$

A perceptually consistent quantization scheme $q^x$ should insure that an error of quantization $e_{q^x}(z)$ is constant regarding the minimal perceptible distance whatever the considered depth. In other word one should have:

$$\frac{e_{q^x}(z)}{\alpha z} = \text{constant}$$

which is the case neither for $q^l$ nor $q^i$. In contrast, the quantization function 73 defined with $q^\alpha(z)$ is perceptually consistent:

$$q^\alpha(z) = \frac{\ln(z) - \ln(z_{min})}{\ln(1 + \alpha)}$$

This quantization function 73 implies the following reciprocal recursive sequence $z_{i+1}=(1+\alpha)z_i$ (with $z_0=z_{min}$) and the associated reciprocal function $z^{\alpha}(q)=z_{min}(1+\alpha)^q$. Moreover, it is straightforward that $$\frac{e_{q^{\alpha}}(z)}{\alpha z}=\frac{\ln(1+\alpha)z}{\alpha z}=\frac{\ln(1+\alpha)}{\alpha}=\text{constant}$$

which insures that the associated quantization error is perceptually consistent, whatever the depth z (the error is linear with regard to the depth).

Nevertheless, the quantization function 73, like the quantization functions 71 and 72, does not feet the encoding bit-depth (typically 8 or 10 bits or 12 bits) constraint imposed by legacy video encoders such as HEVC encoder. As it appears on FIG. 7C, more than 5000 quantized depth values are needed for a depth range comprised between $z_{min}=0$ and $z_{max}=50$ meters, that is to say more than $2^{12}$ values.

Figure 9:
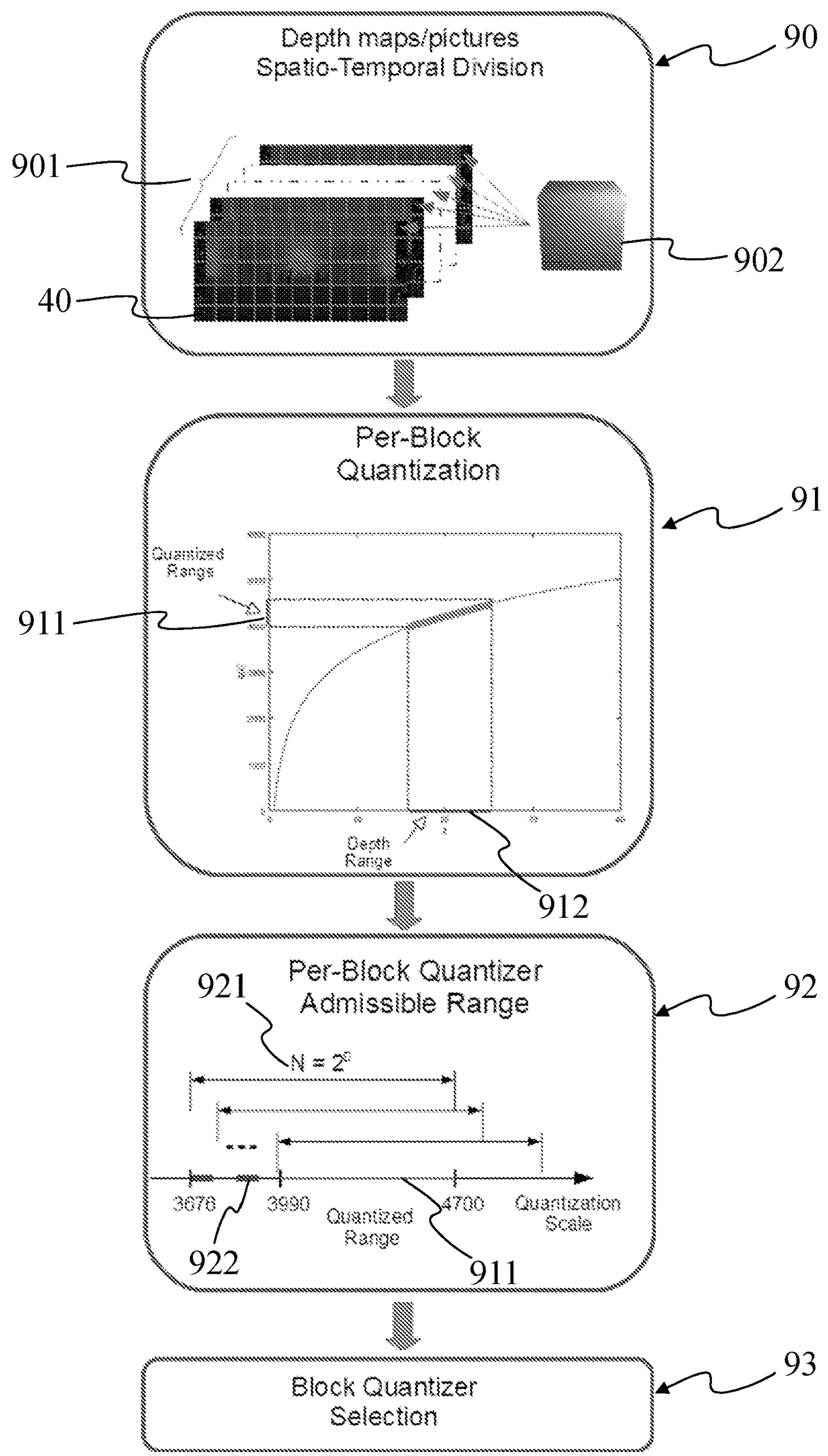
FIG. 9 shows an example of a process to determine quantization parameters from the picture of FIG. 4 or 5, according to a non-restrictive embodiment of the present principles.

FIG. 9 shows an example of a process to determine quantization parameters from the picture 40 or 50, according to a non-restrictive embodiment of the present principles.

In a first operation 90, the picture 40 (or 50) comprising the data representative of depth (a depth value being associated with (or stored in) each first pixel of the picture 40, 50) is divided into a plurality of blocks of first pixels, for example in blocks of 8×8 or 16×16 first pixels, forming an array of blocks of first pixels. The picture 40 (or 50) may optionally be part of a group of pictures 901. A same quantization function, such as the quantization function 71, 72 or 73, is applied to the picture 40, i.e. to all blocks of the picture 40. When the picture 40 is part of a GOP 901, the same quantization function is applied to each picture of the GOP, each picture of the GOP being divided in a same way, in a same plurality of blocks of first pixels. The process of FIG. 5 will be described by referring to one block when the process is performed on a single picture 40 (or 50), for example the upper right block of the picture, the same process being applied to each block in a same manner. When the picture 40 is part of the GOP 901, the process of FIG. 5 will be described by referring to one spatio-temporal block 902, which represents the set union of all upper right blocks of each picture of the GOP 901. The block 902 encompasses all quantized depth values of all upper rights blocks of each picture of the GOP 901. Each block of first pixels of the picture 40 may be represented by the row index "i" and the column index "j" the block belongs to. The blocks of first pixels represented by the block 902 have the same row and columns indices in their respective pictures.

In a second operation 91, the quantization function 73 is applied to the depth data of the upper right block of the picture 40 (or to each upper right block of all pictures of the GOP 901). The depth data is represented with a range of depth values 912 with a minimal depth value $z_{min}$ and a maximal depth value $z_{max}$, which correspond to the limits of the range 912. The applying of the quantization function 73 to the range 912 enables to obtain a range of quantized depth values 911.

In a third operation 92, the range of quantized value 911 is analyzed to determine a unique per-block quantizer, this quantizer corresponding to a quantization parameter representative of the range 911 of quantized depth values. To reach that aim, a set of candidate quantization parameters is determined for the range 911. The set of candidate quantization parameters comprises a plurality of quantized depth values that may be used as a reference to represent the range of quantized depth values 911. A candidate quantization parameter $q^{i,j}$ is a special value of the quantization scale such that the range $[q^{i,j}, q^{i,j}+N-1]$ covers the range 911 of quantized depth value previously identified for the considered block of first pixels, N corresponding to the number of encoding values allowed by the bit-depth of the encoder used to encode the depth data of the picture 40 or 50 (or of the pictures of the GOP 901). As an example, the bit-depth is 10 bits and $N=2^{10}=1024$. For example, considering that the range 911 of quantized depth values is [3990, 4700], with $z_{min}=3990$ and $z_{max}=4700$. Considering a value for N 921 equal to 1024, the set 922 of candidate quantization parameters corresponds to the range of values [3676, 4699], with $3676=z_{max}-N$. The same process is reiterated for each block of first pixels of the picture 40 (or of the GOP 901) to obtain a first set of candidate quantization parameters for each block of the picture 40 (or of the GOP 901).

In a fourth operation 93, a second set of quantization parameters that corresponds to a subset of the first set of candidate quantization parameters is determined. To reach that aim, it is determined within the first set of candidate quantization parameters the minimal number of candidate quantization parameters that may be used to represent all blocks of first pixels, i.e. all ranges of quantized depth values. This second set may for example be obtained by applying a greedy algorithm to get an optimally sized second set for the whole picture 40 (or for the whole GOP 901). A greedy algorithm iteratively makes locally the optimal choice at each stage. According to a variant, the second set may be obtained with a genetic algorithm or with an evolutionary algorithm or with a particle swarms algorithm. The obtained second set of quantization parameters may for example be stored in an image 100 described in relation to FIG. 10.

Figures 10, 11:
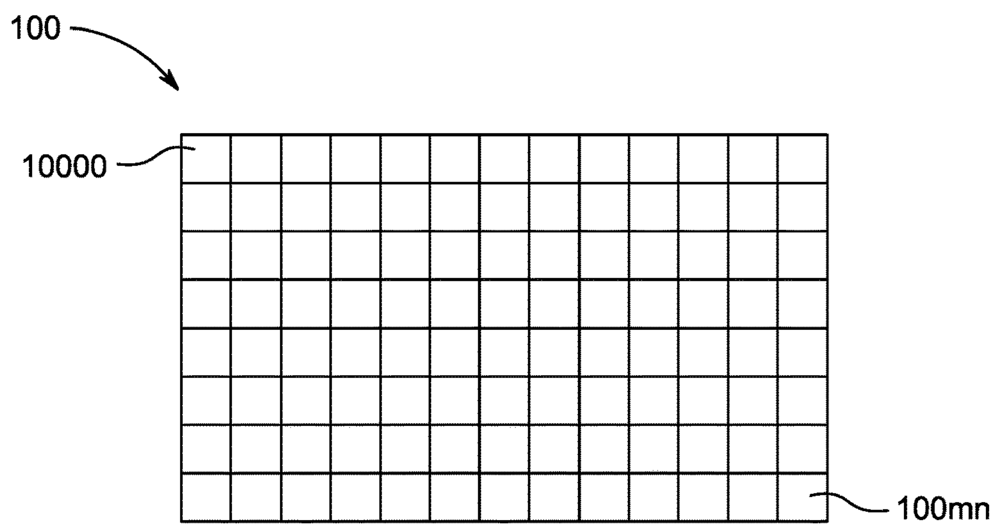
FIG. 10 shows an example of an image containing information representative of the quantization parameters associated with the picture of FIG. 4 or 5, according to a non-restrictive embodiment of the present principles.
FIG. 11 shows an example of a table mapping identifiers with the quantization parameters associated with the picture of FIG. 4 or 5, according to a non-restrictive embodiment of the present principles.

FIG. 10 shows an example of an image 100 containing information representative of the quantization parameters associated with the picture 40 or 50 (or with the GOP comprising the picture 40 or 50), according to a non-restrictive embodiment of the present principles.

The image 100 corresponds to a matrix of second pixels arranged in rows and columns. The number of columns of the image 100 corresponds to the number of first pixels in a row of the picture 40 divided by the block size and the number of rows corresponds to the number of first pixels in a column of the picture 40 divided by the block size. For example, if the size of the picture 40 is 4096×2160 first pixels and the size of a block is 8×8 first pixels, the number of columns of the image 100 is 512 and the number of rows is 270. The number of second pixels is therefore 512×270. Each second pixel of the image 100 is associated with a corresponding block of first pixels of the picture 40 or 50 (or of the GOP 901). For example, the upper left second pixel $\mathbf{100}_{00}$ is associated with the upper left block of first pixels of the picture 40 or 50, the index 00 of the reference number $100_{00}$ of this upper left second pixel corresponding to the row and columns indices this upper left second pixel belongs to. The second pixels may be identified with the reference numbers $100_{00}$ to $100_{mn}$ with their index corresponding to the index (row and column in the array of blocks of first pixels of the picture 40 or 50) of the blocks of first pixels the second pixels are associated with. Each second pixel may receive the quantization parameter determined in operation 93 to represent the range of quantized depth values of the block of first pixel said each second pixel is associated with. As several second pixels receive the same quantization parameter (as at least spatially adjacent blocks of the first pixels share common (identical) quantization parameters of the second), compression efficiency of the image 100 is high when encoding this image 100.

To reduce the bit rate when transmitting the encoded image 100, identifiers may be mapped to the quantization parameters of the second set and these identifiers are stored in the second pixels instead of the quantization parameters. It has been observed that a few dozen of quantization parameters may be sufficient to represent all ranges of quantized depth values comprised in the block of first pixels of the picture 40 or 50. According to this specific embodiment, the image 100 may contain one identifier per second pixel, the image enabling to map the identifiers with the blocks of first pixels, as one second pixel of the image 100 is associated with (or corresponds to) one block of first pixels of the picture 40 or 50. The mapping between the identifiers and the quantization parameters may be for example stored on a LUT (Look-Up-Table) such as the table 110 described in relation to FIG. 11.

FIG. 11 shows an example of a table 110 mapping identifiers with the quantization parameters associated with the picture 40 or 50, according to a non-restrictive embodiment of the present principles.

The table 110 comprises a list of identifiers 'Id' mapping to values of the quantization parameters of the second set, one identifier mapping to one quantization parameter in a first part 111 of the table and one identifier mapping to a plurality of quantization parameters in a second part of the table 112. The identifiers 'Id' may for example be coded on 8 bits, the Id taking the integer values 0 to 255.

According to a variant, to reduce the bit rate when transmitting the table 110, the values of the plurality of quantization parameters associated with one identifier in the second part 112 are replaced with the identifiers of the first part 111 these quantization parameter values map to. For example, the identifier 128 map to the identifiers 1, 7, 0 and 0 of the first part, meaning that the quantization parameters identified with the Id 128 are the values 1200 and 5010, 1200 being identified with identifier '1' and 5010 being identified with the identifier '7' in the first part 111. The second part 112 refers to the first part 111 of the list or table of identifiers 110. According to this variant, the values the identifiers map to may be for example encoded on 32 bits.

In a first embodiment, the size of the first part is set to a fixed value shared by the encoder and the decoder. For example, the half of the size of table 110. In the example of FIG. 11, identifiers from 0 to 127 are used for the first part of table 110 and identifiers from 128 to 255 are used for the second part of table 110. The ratio between the first and the second part may be different, for example 60% or 80% of the identifiers for the first part, as long as, this ratio is known by the decoder so it can retrieve the first and the second part to properly decode values stored in table 110.

In another embodiment, the size of the first part is variable depending on the scene and the results of step 92 of FIG. 9. For example, over one Group Of Picture (or one intra-period), the modal depth analysis is performed as described, but the the number of identifiers for the first part of table 110 may be the number of found single modes plus one over the GOP. If the total number of modes (single+combined) exceed the size of table 110 (e.g. 256 values), a smart selection could be performed to keep, for instance, the 256 more representative or closer modes. The size of the first part is then set to the number of kept single modes plus one over the GOP. This size value is an information added to the metadata associated with table 100, so the decoder can retrieve the size of the first part to properly decode values stored in table110.

Figure 12:
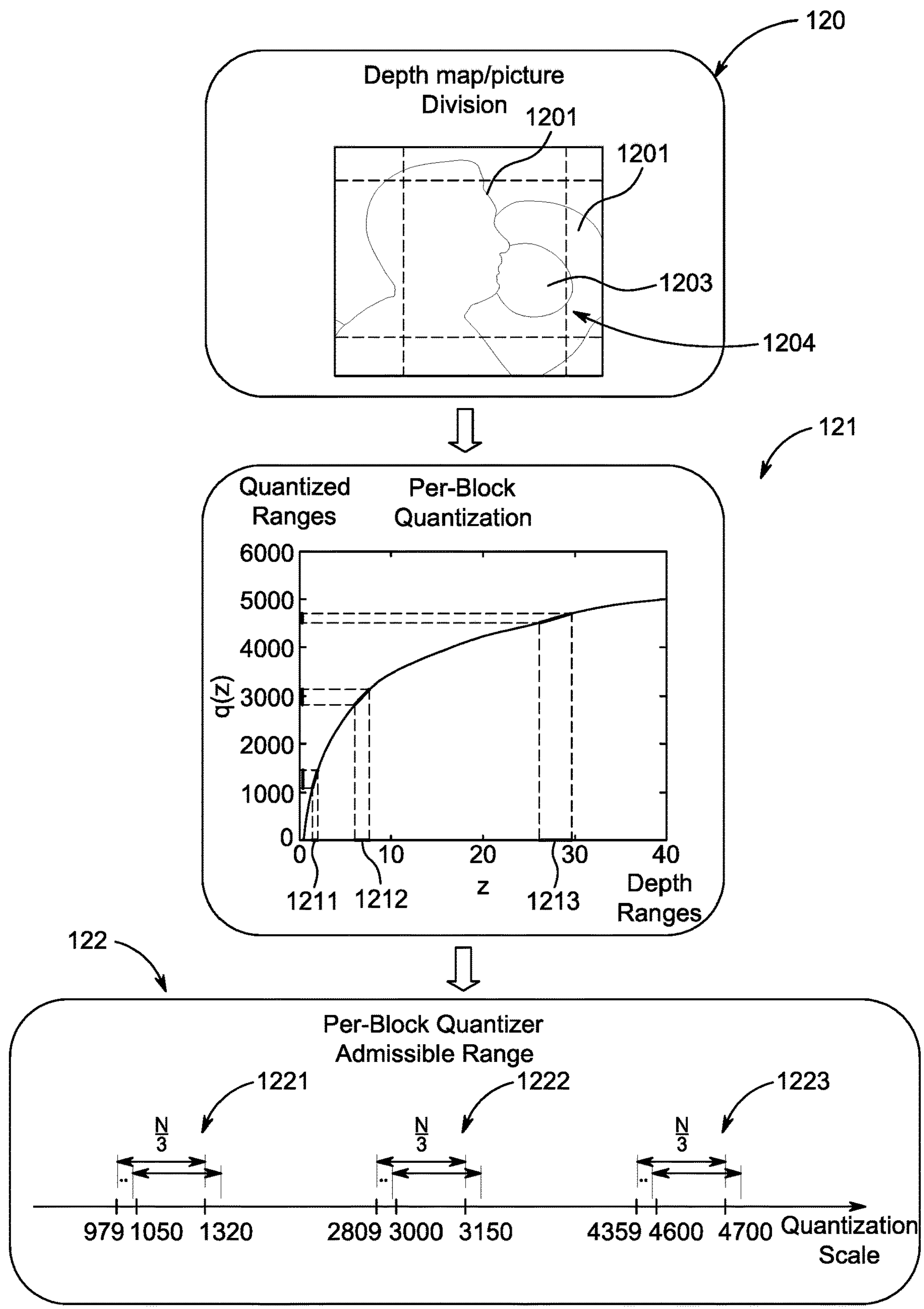
FIG. 12 shows an example of a process to determine a plurality of quantization parameters from a single block of pixels of the picture of FIG. 4 or 5, according to a non-restrictive embodiment of the present principles.

FIG. 12 shows an example of a process to determine a plurality of quantization parameters for a single block of pixels of the picture 40 or 50, according to a non-restrictive embodiment of the present principles.

This process is similar to the one described in relation to FIG. 9 but applies to block of first pixels comprising a plurality of ranges of quantized depth values, which are not contiguous on the quantization scale. This case appears when the content of the scene covered by a block of first pixels comprises objects or parts of objects of the scene located at different depths. When a GOP is considered, this case may also appear when a motion occurs during the GOP. In such a case, one single quantification parameter is not sufficient to represent the whole quantized depth values of a considered block of first pixels.

The first operation 120 corresponds to the first operation 90 of FIG. 9, i.e. the division of the picture 40 (or of the pictures of the GOP) into a plurality of blocks of first pixels. According to the example of FIG. 12, a specific block of first pixels 1204 is considered. The block 1204 comprises several areas 1201, 1202 and 1203, each area corresponding to a part of an object of the 3D scene 10, each part being at a different depth with depth gaps between each part of object 1201 to 1203.

The second operation 121 corresponds to the second operation 91 of FIG. 9, i.e. the applying of a same quantization function (e.g. the quantization function 71, 72 or 73) to the picture 40 or to the GOP of pictures, specifically to the block 1204 in the example of FIG. 12. Three ranges of depth 1211, 1212 and 1213, each corresponding to the depth values/data of the areas 1201, 1202 and 1203 respectively of the block 1204. These 3 ranges are not contiguous, meaning that a gap of distance exist between these ranges, i.e. there is a gap between the upper limit of the range 1211 and the lower limit of the range 1212 and there is a further gap between the upper limit of the range 1212 and the lower limit of the range 1213. The applying of the quantization function to these ranges of depth enables to obtain three corresponding ranges of quantized depth values, one for each range of depth values 1211, 1212 and 1213, with a gap between pairs of ranges of quantized depth values.

The third operation 122 corresponds to the third operation 92 and the fourth operation 93 of FIG. 9, i.e. the determining of quantization parameters. The same process is applied but with only a part of the number N of encoding values allowed by the bit-depth of the encoder for each range of quantized depth values. For example, the number of encoding values used for determining the set of candidate quantization parameters is N divided by the number of ranges of depth values detected in the block, i.e. 3 in the example of FIG. 12. A combination of $M^{(i,j)}$ quantifiers $\{q_k^{(i,j)}\}_{0 \le k < M^{(i,j)}}$ is associated with each block of first pixels. In that case, the definition of a quantization parameter (that may also be called a quantizer) is slightly modified in comparison to FIG. 9. It becomes a value of the quantized scale such that the range $[q_k^{i,j}, q_k^{i,j}+W^{(i,j)}-1]$ covers the range of associated quantized depth values. This latter range $[q_k^{i,j}, q_k^{i,j}+W^{(i,j)}-]$ may for example be called a depth mode and $$W^{(i,j)} = \frac{N}{M^{(i,j)}}$$

is the length of the mode. The dynamic of the encoder $N=2^D$ may be harmoniously shared between each mode and the dynamic per quantifier is reduced each time a new quantifier is required, i.e. each time a new range of depth values is detected in a block. In the example of FIG. 12, 3 ranges 1221, 1222 and 1223 of candidate quantization parameters may be determined, one for each range of quantized depth values. The first range 1221 may be equal to [979, 1319], the second range 1222 may be equal to [2809, 3149] and the third range 1223 may be equal to [4359, 4699]. A second set of quantization parameters that corresponds to a subset of the first set of candidate quantization parameters may then be determined in a same way as in the fourth operation 93 described in relation to FIG. 9.

An example number of quantization parameters (including the case of mono-modal blocks comprising a single depth range and multi-modal blocks comprising several depth ranges) is, in the example of the 3D scene 10, close to 40 (i.e. lower than 128 corresponding to the first part 111 of the table 110), whereas the number of different combination of quantization parameters involved in multi-modal blocks (i.e. blocks with several depth ranges) is for example close to 30 (also lower than 128 corresponding to the second part 112 of the table 110). Moreover, for multi-modal blocks, the number of involved quantization parameters $M^{(i,j)}$ is rarely over 3 for each block.

A compact way to store and reference the different modes of each block (i.e. mono-modal and multi-modal) may be achieved by considering the quantization table 110 of FIG. 11 with 256 elements (i.e. identifiers), each element being coded on 32 bits. Depending on its position in the table, each element may be interpreted differently (depending on whether the element belongs to the first part 111 or to the second part 112). If it belongs to the first half part 111 of the table (position 1 to 127—0 being reserved for empty blocks), the associated values should be interpreted as a 32 bits integer which value is a quantization parameter value. If it belongs to the second half part 112 of the table (position 128 to 255), then the 32 bits should be interpreted as a combination of up to four 8 bits integers, each integer being comprised between 0 and 127 and pointing to the corresponding element of the first part of the table. This second part 112 of the table implicitly encodes a combination of up to 4 quantizers and the corresponding table positions are referenced by the quantization map (i.e. the image 100) to describe multi-modal blocks. The quantization map 100 only contains values comprised between 0 and 255 (quantization table size) and can be encoded by 8 bits per element map (i.e. second pixel).

For multi-modal blocks, the number of involved quantizers $M^{(i,j)}$ on the block may be inferred by counting the number of non-zero values in the 4×8 bits integers embedded in the 32 bits of the corresponding value in the quantization map 111. Depending on this latter number, the length of each associated mode (mono-modal and multi-modal) may be straightforwardly deduced.

Figure 13:
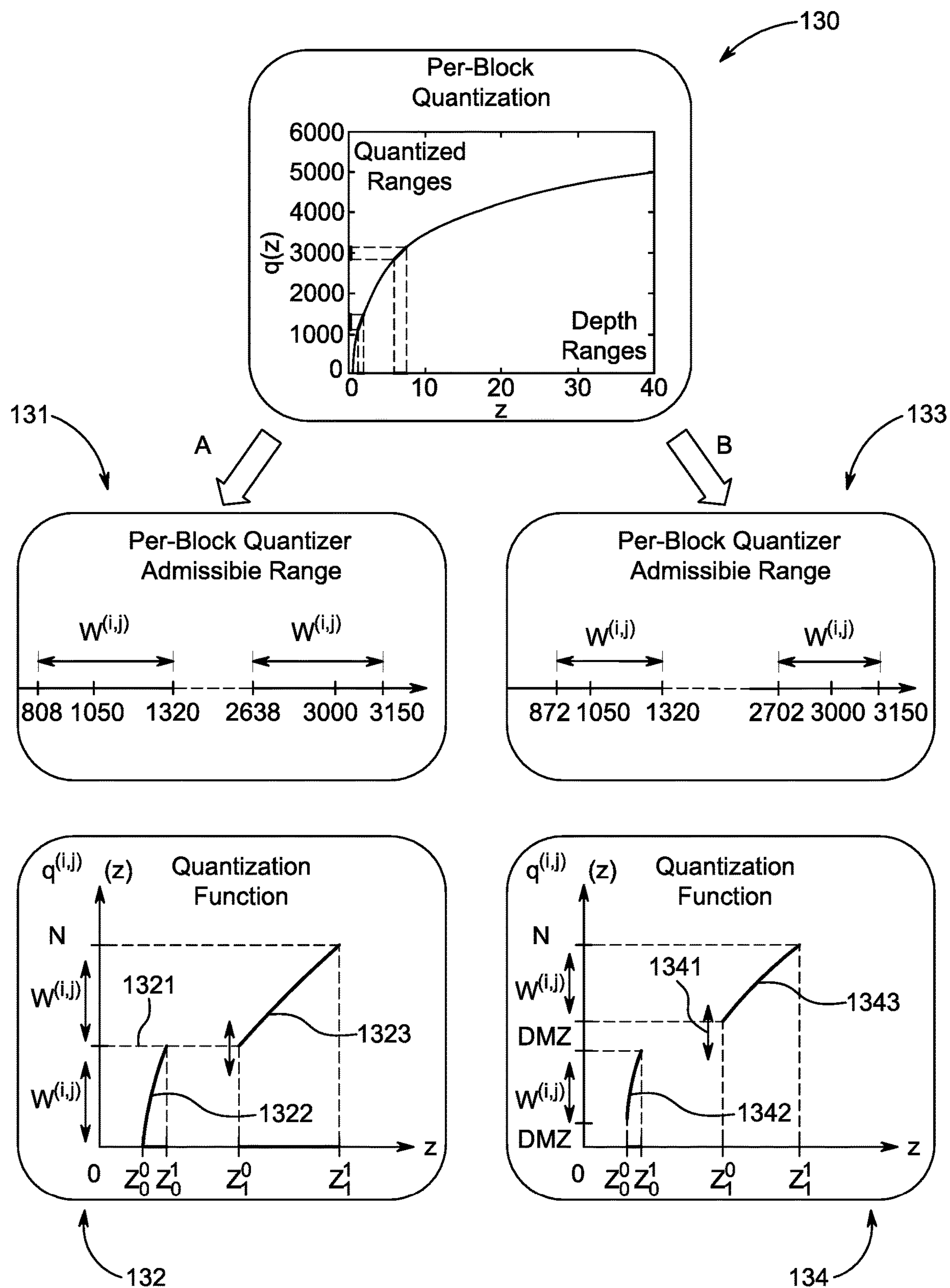
FIG. 13 shows examples of methods to encode quantized depth values of the 3D scene of FIG. 1, according to two non-restrictive embodiments of the present principles.

FIG. 13 shows examples of methods to encode quantized depth values of the picture 40 or 50, according to non-restrictive embodiments of the present principles.

In a first operation 130, depth ranges of a block are quantized using a quantization function such as the quantization function 71, 72 or 73, as in the operation 120 of FIG. 12. The obtained ranges of quantized depth values may be encoded according to two different methods, a first method A with operations 131 and 132 and a second method B with operations 133 and 134.

Regarding the method A, quantization parameters are determined in operation 131 in a same way as described with regard to operation 122 of FIG. 12. An image 100 and associated table 110 are generated as explained hereinabove.

In operation 132, the quantization of the depth values of the picture 40 may be addressed. To do so, quantization parameters $\{q_k^{(i,j)}\}_{0 \le k < M^{(i,j)}}$ for the block located at (i,j) are determined. This second set of quantization parameters is implicitly described by the image 100 and associated table 110. For a given depth z to quantize, let's call $q_{k^z}^{(i,j)} \in \{q_k^{(i,j)}\}_{0 \le k < M^{(i,j)}}$ the quantization parameter such that $$q_{k^z}^{(i,j)} \le q^{\alpha}(z) < (q_{k^z}^{(i,j)} + W^{(i,j)})$$

Then the quantized depth may be express by:

$$q^{(i,j)} = q^{\alpha}(z) + [k^z W^{(i,j)} - q_{k^z}^{(i,j)}]$$

As one can observe in the part of FIG. 13 corresponding to the operation 132, this latter quantization function corresponds to a "by parts" concatenation of quantization function $q^{\alpha}$ used for quantizing each depth range, considering the quantization parameter for each depth range. However, a simple concatenation as in operation 132 may generate some issues, while the encoding of the depth values enables to use the full encoding dynamic N for each block. Indeed, if "within" each part 1322 and 1323, the properties of $q^{\alpha}$ guaranty a good robustness to video coding artifacts, it is not the case at the limits of each concatenated part. For example, at the level of the upper limit 1321 of the part 1322 which corresponds to the lower limit of the part 1323, coding artifacts may make a quantized value switch from one depth mode 1322 to another 1323 (or inversely) with possible unwanted visual impact at the decoding side. For example, an error of 1 in the decoded quantized depth value at the lower limit of the part 1323 may induce the use of the part 1322 of the reciprocal of the quantization function instead of the part 1323 of the reciprocal of the quantization function, or inversely.

The method B may be implemented to solve the issue of the method A. In operation 133, quantization parameters are determined. Instead of sharing the number of encoding values N between all ranges (N divided by the number of ranges as described in operation 122 of FIG. 12), a part of the encoding values is reserved, this part being for example called DMZ. This part is reserved in the sense that the values of this part cannot be used for encoding the quantized depth values according to the associated quantization parameters. For example, 6.25% of the number N of encoding values is reserved, i.e. 64 values for N=1024. Such a modification impacts the way how the depth mode length is computed. This latter, so far expressed as $$W^{(i,j)} = \frac{N}{M^{(i,j)}},$$

has now to be computed as $$W^{(i,j)} = \frac{N - M^{(i,j)} DMZ}{M^{(i,j)}}.$$

On one hand, the introduction of this safety zone therefore reduces a bit the number of encoding values allocated per depth range (i.e. per quantization parameter), but on the other hand, it guarantees a good robustness at the limit or frontier between each encoded depth mode. With this modification, the per-block quantization function is slightly adapted and is finally expressed as:

$$q^{(i,j)}(z)=q^{\alpha}(z)+(Q_{k^z}^{(i,j)}-q_{k^z}^{(i,j)})$$

with $Q_{k^z}^{(i,j)}=(k^z+1)DMZ+k^z W^{(i,j)}$.

The result of this per-block quantization function is illustrated in operation 134. The ordinate axis shows the quantized depth values encoded according to the quantization parameter associated with each depth mode (or with each depth range). As it clearly appears from the operation 134, some parts DMZ of the encoding values are not used for the encoding of the quantized depth values, these parts being located at the limits of the depth mode (depth ranges). When decoding the encoded quantized depth value, if a decoded value falls within a DMZ part, this value is simply discarded, which avoid the generation of artefacts.

Figure 14:
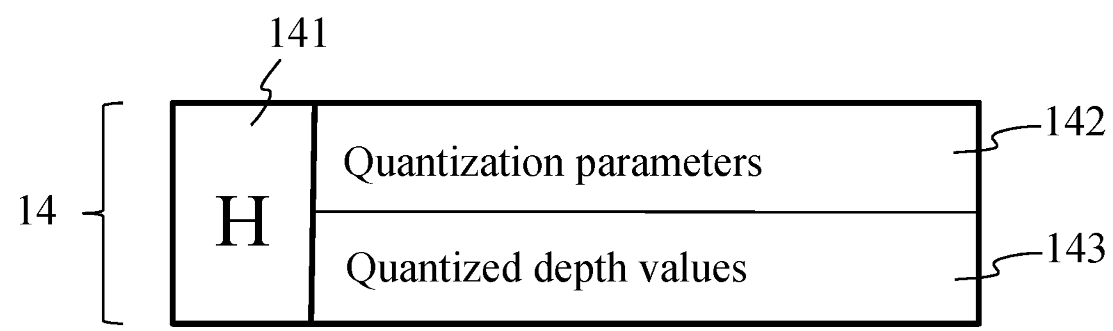
FIG. 14 shows an example of the syntax of a bitstream carrying the information and data representative of the depth of the 3D scene of FIG. 1, according to a non-restrictive embodiment of the present principles.

FIG. 14 shows a non-limiting example of an embodiment of the syntax of a stream carrying the data representative of the depth of the 3D scene when the data are transmitted over a packet-based transmission protocol. FIG. 14 shows an example structure 14 of a video stream. The structure consists in a container which organizes the stream in independent elements of syntax. The structure may comprise a header part 141 which is a set of data common to every syntax elements of the stream. For example, the header part comprises metadata about syntax elements, describing the nature and the role of each of them. The header part may also comprise the coordinates of the viewpoint used for the encoding of the picture 40, 50 and information about the size and the resolution of the picture. The structure comprises a payload comprising a first element of syntax 142 and at least one second element of syntax 143. The first syntax element 142 comprises data representative of the quantization parameters, for example the image 100 and optionally the table 110.

The one or more second syntax elements 143 comprises geometry information, i.e. depth information. The one or more second syntax elements 143 comprise for example quantized depth values that are encoded according to the quantization parameters.

According to a variant, one or more additional second syntax elements 143 comprise the data representative of texture of the picture 30.

According to a further optional variant, the stream further comprises at least one of the following parameters, for example under the form of metadata:

- the DMZ value;
- the parameters required to compute the quantization function, for example $\alpha$ and $z_{min}$;
- the number of encoding value N allowed by the encoder bit depth.

The following parameters or at least a part of them (e.g. the DMZ value or the parameters of the quantization function) may be transmitted once per GOP. According to a variant, these parameters are stored at the decoder and are not transmitted.

For illustration purpose, in the context of ISOBMFF file format standard, texture patches, geometry patches and the metadata would typically be referenced in ISOBMFF tracks in a box of type moov, with the texture data and geometry data themselves embedded in media-data box of type mdat.

On the decoding side, the set of metadata described hereinabove is retrieved and used to dequantized each block of the received depth atlases. More precisely, for each block (i, j) the set $q_{k^z}^{(i,j)} \in \{q_k^{(i,j)}\}_{0\le k<M^{(i,j)}}$ of required quantization parameters (also called quantifiers) is deduced from the quantization table 110 and map as well as the associated mode length $$W^{(i,j)}=\frac{N-M^{(i,j)}DMZ}{M^{(i,j)}} \text{ with } N=2^D.$$

Let q be the quantized depth to be dequantized. Let's note $k^Z$, $0\le k^z<M(i,j)$ such that $$Q_{k^z}^{(i,j)}\le q<(Q_{k^z}^{(i,j)}+W^{(i,j)})$$

(with $Q_{k^z}^{(i,j)}=(k^z+1)DMZ+k^z W^{(i,j)}$ as defined before). Let $q_{k^z}^{(i,j)} \in \{q_k^{(i,j)}\}_{1\le k\le M^{(i,j)}}$ be the associated quantizer, then the depth value z associated with a first pixel (i,j) of the picture 40 or 50 may be dequantized by:

$$z^{(i,j)}=z^{\alpha}(q-(Q_{k^z}^{(i,j)}-q_{k^z}^{(i,j)}))$$

$z^{\alpha}$ being the reciprocal of the quantization function $q^{\alpha}$.

The latter example corresponds to the method implementing a DMZ. For the method without DMZ, the same formulas apply with DMZ=0.

Figure 15:
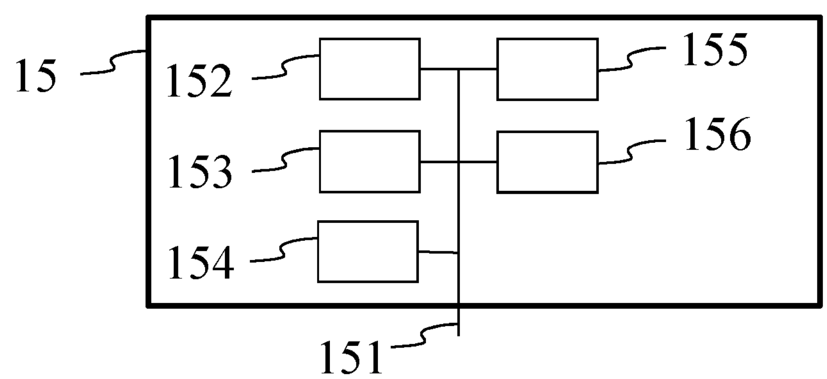
FIG. 15 shows an example architecture of a device which may be configured to implement a method or process described in relation with FIGS. 9, 12, 13, 16 and/or 21, according to a non-restrictive embodiment of the present principles.

FIG. 15 shows an example architecture of a device 15 which may be configured to implement a method described in relation with FIGS. 9, 12, 13, 16 and/or 17. The device 15 may be configured to be an encoder 61 or a decoder 63 of FIG. 6.

The device 15 comprises following elements that are linked together by a data and address bus 151:

- a microprocessor 152 (or CPU), which is, for example, a DSP (or Digital Signal Processor);
- a ROM (or Read Only Memory) 153;
- a RAM (or Random-Access Memory) 154;
- a storage interface 155;
- an I/O interface 156 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 153 comprises at least a program and parameters. The ROM 153 may store algorithms and instructions to perform techniques in accordance with present principles. When switched on, the CPU 152 uploads the program in the RAM and executes the corresponding instructions.

The RAM 154 comprises, in a register, the program executed by the CPU 152 and uploaded after switch-on of the device 15, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

In accordance with an example of encoding or an encoder 61 of FIG. 6, the depth data of the three-dimension scene is obtained from a source. For example, the source belongs to a set comprising:

- a local memory (153 or 154), e.g. a video memory or a RAM (or Random-Access Memory), a flash memory, a ROM (or Read Only Memory), a hard disk;
- a storage interface (155), e.g. an interface with a mass storage, a RAM, a flash memory, a ROM, an optical disc or a magnetic support;
- a communication interface (156), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 63 of FIG. 6, the stream is sent to a destination; specifically, the destination belongs to a set comprising:

- a local memory (153 or 154), e.g. a video memory or a RAM, a flash memory, a hard disk;
- a storage interface (155), e.g. an interface with a mass storage, a RAM, a flash memory, a ROM, an optical disc or a magnetic support; and
- a communication interface (156), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi or a Bluetooth interface).

In accordance with examples of encoding or encoder, a bitstream comprising data representative of the depth of the 3D scene is sent to a destination. As an example, the bitstream is stored in a local or remote memory, e.g. a video memory or a RAM, a hard disk. In a variant, the bitstream is sent to a storage interface, e.g. an interface with a mass storage, a flash memory, ROM, an optical disc or a magnetic support and/or transmitted over a communication interface, e.g. an interface to a point to point link, a communication bus, a point to multipoint link or a broadcast network.

In accordance with examples of decoding or decoder or renderer 63 of FIG. 6, the bitstream is obtained from a source. Exemplarily, the bitstream is read from a local memory, e.g. a video memory, a RAM, a ROM, a flash memory or a hard disk. In a variant, the bitstream is received from a storage interface, e.g. an interface with a mass storage, a RAM, a ROM, a flash memory, an optical disc or a magnetic support and/or received from a communication interface, e.g. an interface to a point to point link, a bus, a point to multipoint link or a broadcast network.

In accordance with examples, the device 15 is configured to implement a method described in relation with FIGS. 9, 12, 13, 16 and/or 17, and belongs to a set comprising:

- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 16:
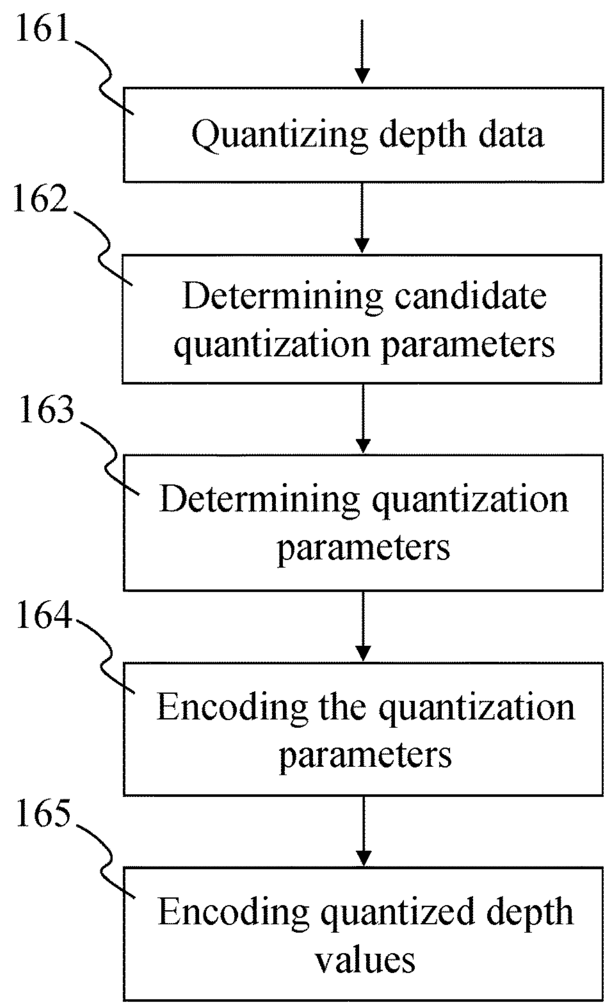
FIG. 16 shows an example of a method for encoding data representative of depth of the 3D scene of FIG. 1, implemented for example in the device of FIG. 15, according to a non-restrictive embodiment of the present principles.

FIG. 16 illustrates a method for encoding data representative of the depth of a 3D scene, for example the 3D scene 10, according to a non-restrictive embodiment of the present principles. The method may for example be implemented in the encoder 61 and/or in the device 15. The different parameters of the device 15 may be updated. The 3D scene may for example be obtained from a source, one or more points of view may be determined in the space of the 3D scene, parameters associated with projection mapping(s) may be initialized.

In a first operation 161, the data representative of depth (for example the distance between the viewpoint of the picture 40 or 50 and points of the 3D scene visible from the viewpoint) is quantized, generating a number of quantized depth values. Depending on the depth range and on the quantization function, the number of quantized depth values may be high, for example greater than 5000, than 50000 or more. The number of quantized depth values is in any case greater than or much greater than a number N of encoding values that is allowed by the encoding bit depth of the encoder used to encode the depth data. As an example, the number of encoding values is equal to 256 values (with a bit depth of 8 bits) or equal to 1024 (with a bit depth of 10 bits). The quantization function used for quantizing the depth data may optionally be a function having a quantization error accounting for depth and human visual perception, the greater the depth, the greater the quantization error.

In a second operation 162, a first set of candidate quantization parameters is determined for each block of first pixels of the picture 40 or 50 comprising the depth data of the 3D scene, or at least a part of the depth data of the 3D scene (for example according to a determined viewpoint). A candidate quantization parameter is a value that it is possible to use as a reference value for encoding the quantized depth values of a range of quantized depth values, the range being defined with its lower and upper limits $z_{min}$ and $z_{max}$. The first set comprises all possible values that may be used as reference value. A candidate quantization parameter of a range of quantized depth values may for example correspond to the starting or initial value for the encoding of the range of values. The first set is determined according to the number N of encoding values, i.e. the range defined by a lower limit equal to the value a candidate quantization parameter and an upper limit equal to said value of the candidate quantization parameter+(N−1) covers the range of quantized depth value said candidate quantization parameter represents.

In a third operation 163, a second set of quantization parameters is determined as a subset of the first sets obtained in operation 162. The second set of quantization parameters comprises the minimal number of quantization parameters that may be used for representing all ranges of quantized depth values of all blocks of the picture 40 or 50. The selection of the candidate quantization parameters may be based on the intersection between the first sets, minimizing the number of selected candidate quantization parameters. A same quantization parameter of at least a part of the second set may be used associated with several blocks of first pixels, i.e. may represent a plurality of different ranges of quantized depth values.

In a fourth operation 164, the second set of quantization parameters is encoded, for example under the form of an image comprising second pixels each associated with a block of first pixels of the picture 40 or 50, each second pixel comprising the one or more quantization parameters used as a reference for the encoding of the one or more range of quantized depth values comprised in the associated block of first pixels. According to a variant, the quantization parameters of the second set are each identified with a unique identifier, each second pixel comprising one ore more identifiers identifying the one or more quantization parameters associated with the corresponding block of first pixels. According to this variant, a table mapping the list of identifiers with the quantization parameters is also encoded. According to a further variant, the table comprises a first list of first identifiers each mapping to a single quantization parameter and a second list of second identifiers each mapping to a plurality of first identifiers. The second set of quantization parameters is advantageously lossless encoded, for example with a deflate compression algorithm or with a run-length encoding algorithm. The table 110 is also advantageously lossless encoded.

In a fifth operation 165, the quantized depth values of each block of first pixels of the picture 40 or 50 are encoded according to the second set of quantization parameters. In other words, each range of quantized depth values of each block is encoded according to its associated quantization parameter of the second set. The quantized depth values are for example encoded or formatted into a track of a container or of a file, according to a determined format, for example according to HEVC/H265: "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265" or according to AV1. The container corresponds for example to an ISOBMFF (ISO Base Media File Format, ISO/IEC 14496-12-MPEG-4 Part 12) file.

According to a variant, the picture 40 or 50 is part of a group of pictures (GOP), the encoding of the depth data of the GOP being performed according to the same second set. According to this variant, the second set needs to be transmitted only once per GOP.

According to a further variant, the method comprises the transmitted of the bitstream comprising the encoded second set and encoded quantized depth values.

Figure 17:
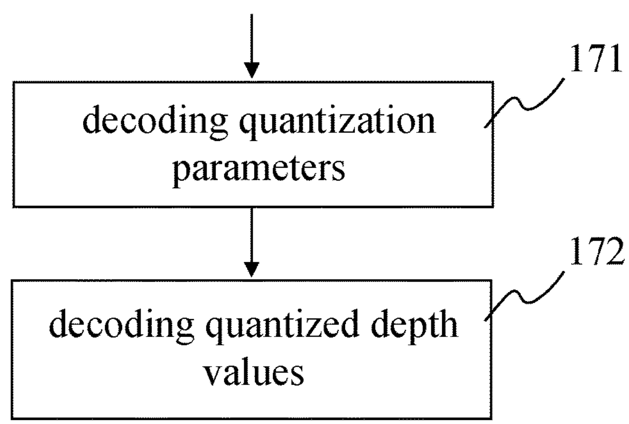
FIG. 17 shows an example of a method for decoding data representative of depth of the 3D scene of FIG. 1, implemented for example in the device of FIG. 15, according to a non-restrictive embodiment of the present principles.

FIG. 17 illustrates a method for decoding data representative of depth of a 3D scene, for example the 3D scene 10, according to a non-restrictive embodiment of the present principles. The method may for example be implemented in the decoder 63 and/or in the device 15.

In a first operation 171, a set of quantization parameters is decoded, for example from a received bitstream. One or more quantization parameters of the set are associated with each block of first pixels of the picture 40 or 50, at least a part of the quantization parameters of the set being common to a plurality of blocks of first pixels of the picture 40 or 50.

In a second operation 172, the quantized depth values associated with the first pixels of the picture 40 or 50 are encoded according to the one or more quantization parameters associated with each block of first pixels. The number of decoded quantized depth values is greater than the number N of encoding values allowed by the encoding bit depth of the encoder used to encode the quantized depth values.

Naturally, the present disclosure is not limited to the embodiments previously described.

In particular, the present disclosure is not limited to a method and device for encoding/decoding data representative of the depth of a 3D scene but also extends to a method for generating a bitstream comprising the encoded data and to any device implementing this method and notably any devices comprising at least one CPU and/or at least one GPU.

The present disclosure also relates to a method (and a device configured) for displaying images rendered from the decoded data of the bitstream.

The present disclosure also relates to a method (and a device configured) for transmitting and/or receiving the bitstream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding data representative of depth of a 3D scene, the method comprising:

quantizing said data in a first range of quantized depth values comprising more than a number of values allowed by an encoding bit depth;

for each block of first pixels of a picture comprising said data:

determining a first set of candidate parameters, a candidate parameter defining a candidate range of values in the first range, the candidate range comprising said number of values and starting at said candidate value such that the quantized depth values are comprised in the candidate range;

determining a second set of candidate parameters as a subset of a union of every first set of candidate parameters determined for each block of first pixels of said picture, said second set comprising the candidate parameters common to a plurality of the blocks, one or more candidate parameters of said second set being associated with each block of first pixels of said picture;

encoding said second set of candidate parameters; and encoding said quantized depth values based on said second set of candidate parameters.

2. The method according to claim 1, wherein a list of identifiers mapping to said second set of candidate parameters is further encoded, said second set of candidate parameters being encoded according to said list of identifiers.

3. The method according to claim 2, wherein said list of identifiers comprises first identifiers each mapped to one candidate parameter of said second set and second identifiers each mapped to a plurality of said first identifiers, said second set of candidate parameters being encoded by encoding an image comprising:

a number of second pixels corresponding to the number of blocks of first pixels of the picture, each second pixel comprising:

a first identifier of said list identifying the candidate parameter associated with the block of first pixels corresponding to said each second pixel, when a single candidate parameter is associated with said block of first pixels; or a second identifier of said list identifying the candidate parameters associated with the block of first pixels corresponding to said each second pixel, when a plurality of candidate parameters is associated with said block of first pixels.

4. The method according to claim 3, wherein said list is associated with a value indicating a number of first identifiers in the list.

5. The method according to claim 1, wherein said data is quantized according to a function having an error accounting for depth and human visual perception, the greater the depth, the greater the error.

6. The method according to claim 1, wherein said number of values is allocated to said each block of first pixels to encode the quantized depth values comprised in said each block of first pixels, a first part of said number of values being allocated to the encoding of each range of quantized depth values comprised in said each block of first pixels, two ranges of encoded quantized depth values being separated by a second part of said number of values, said second part being not used for the encoding of quantized depth values.

7. The method according to claim 1, wherein said picture is part of a group of temporally successive pictures, said second set of candidate parameters being common to each picture of said group of temporally successive pictures.

8. A non-transitory processor readable medium having stored therein instructions for causing a processor to perform at least the steps of the method according to claim 1.

9. A method of decoding data representative of depth of a 3D scene, the method comprising:

decoding a set of parameters, one or more parameters of said set being associated with each block of first pixels of a picture, at least a part of the parameters of said set being common to a plurality of blocks of first pixels of said picture; and decoding quantized depth values comprised in said first pixels of said picture according to the one or more parameters associated with said each block of first pixels, the number of decoded quantized depth values being greater than a number of values allowed by an encoding bit depth.

10. The method according to claim 9, wherein a list of identifiers mapping to said set of parameters is further decoded, said set of parameters being decoded according to said list of identifiers.

11. The method according to claim 10, wherein said list of identifiers comprises first identifiers each mapped to one parameter of said set and second identifiers each mapped to a plurality of said first identifiers, said set of parameters being decoded from an image comprising a number of second pixels corresponding to the number of blocks of first pixels of the picture, each second pixel comprising:

a first identifier of said list identifying the parameter associated with the block of first pixels corresponding to said each second pixel, when a single parameter is associated with said block of first pixels; or a second identifier of said list identifying the parameters associated with the block of first pixels corresponding to said each second pixel, when a plurality of parameters is associated with said block of first pixels.

12. The method according to claim 11, wherein said list is associated with a value indicating a number of first identifiers in the list.

13. The method according to claim 9, wherein said data is obtained from the decoded quantized depth values according to a function having an error accounting for depth and human visual perception, the greater the depth, the greater the error.

14. The method according to claim 9, wherein said picture is part of a group of temporally successive pictures, said set of parameters being common to each picture of said group of temporally successive pictures.

15. A non-transitory processor readable medium having stored therein instructions for causing a processor to perform at least the steps of the method according to claim 9.

16. A device configured to encode data representative of depth of a 3D scene, the device comprising a memory associated with at least one processor configured to:

quantize said data in a first range of quantized depth values comprising more than a number of values allowed by an encoding bit depth;

for each block of first pixels of a picture comprising said data:

determine a first set of candidate parameters, a candidate parameter defining of a candidate range of in the first range, the candidate range comprising said number of values and starting at said candidate parameter such that quantized depth values are comprised in the candidate range;

determine a second set of candidate parameters as a subset of a union of every first set of candidate parameters determined for each block of first pixels of said picture, said second set comprising the candidate parameters common to a plurality of the blocks, one or more candidate parameters of said second set being associated with each block of first pixels of said picture;

encode said second set of candidate parameters; and encode said quantized depth values based on said second set of candidate parameters.

17. The device according to claim 16, wherein a list of identifiers mapping to said second set of candidate parameters is further encoded, said second set of candidate parameters being encoded according to said list of identifiers.

18. The device according to claim 17, wherein said list of identifiers comprises first identifiers each mapped to one candidate parameter of said second set and second identifiers each mapped to a plurality of said first identifiers, said second set of candidate parameters being encoded by encoding an image comprising a number of second pixels corresponding to the number of blocks of first pixels of the picture, each second pixel comprising:

a first identifier of said list identifying the candidate parameter associated with the block of first pixels corresponding to said each second pixel, when a single candidate parameter is associated with said block of first pixels; or a second identifier of said list identifying the candidate parameters associated with the block of first pixels corresponding to said each second pixel, when a plurality of candidate parameters is associated with said block of first pixels.

19. The device according to claim 18, wherein said list is associated with a value indicating a number of first identifiers in the list.

20. The device according to claim 16, wherein said data is quantized according to a function having an error accounting for depth and human visual perception, the greater the depth, the greater the error.

21. The device according to claim 16, wherein said number of values is allocated to said each block of first pixels to encode the quantized depth values comprised in said each block of first pixels, a first part of said number of values being allocated to the encoding of each range of quantized depth values comprised in said each block of first pixels, two ranges of encoded quantized depth values being separated by a second part of said number of values, said second part being not used for the encoding of quantized depth values.

22. The device according to claim 16, wherein said picture is part of a group of temporally successive pictures, said second set of candidate parameters being common to each picture of said group of temporally successive pictures.

23. A device configured for decoding data representative of depth of a 3D scene, the device comprising a memory associated with at least one processor configured to:

decoding a set of parameters, one or more parameters of said set being associated with each block of first pixels of a picture, at least a part of the parameters of said set being common to a plurality of blocks of first pixels of said picture; and decoding quantized depth values comprised in said first pixels of said picture according to the one or more parameters associated with said each block of first pixels, the number of decoded quantized depth values being greater than a number of values allowed by an encoding bit depth.

24. The device according to claim 23, wherein a list of identifiers mapping to said set of parameters is further decoded, said set of parameters being decoded according to said list of identifiers.

25. The device according to claim 24, wherein said list of identifiers comprises first identifiers each mapped to one parameter of said set and second identifiers each mapped to a plurality of said first identifiers, said set of parameters being decoded from an image comprising a number of second pixels corresponding to the number of blocks of first pixels of the picture, each second pixel comprising:

a first identifier of said list identifying the parameter associated with the block of first pixels corresponding to said each second pixel, when a single parameter is associated with said block of first pixels; or a second identifier of said list identifying the parameters associated with the block of first pixels corresponding to said each second pixel, when a plurality of parameters is associated with said block of first pixels.

26. The device according to claim 25, wherein said list is associated with a value indicating a number of first identifiers in the list.

27. The device according to claim 23, wherein said data is obtained from the decoded quantized depth values according to a function having an error accounting for depth and human visual perception, the greater the depth, the greater the error.

28. The device according to claim 23, wherein said picture is part of a group of temporally successive pictures, said set of parameters being common to each picture of said group of temporally successive pictures.

* * * * *